(12) United States Patent
Mizusawa et al.

(10) Patent No.: US 7,787,898 B2
(45) Date of Patent: Aug. 31, 2010

(54) MOBILE WIRELESS COMMUNICATION TERMINAL AND MOBILE WIRELESS COMMUNICATION SYSTEM

(75) Inventors: Nishiki Mizusawa, Kanagawa (JP); Tomonori Nagano, Chiba (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 870 days.

(21) Appl. No.: 11/571,056

(22) PCT Filed: Jun. 20, 2005

(86) PCT No.: PCT/JP2005/011252
§ 371 (c)(1),
(2), (4) Date: Dec. 21, 2006

(87) PCT Pub. No.: WO2006/006347
PCT Pub. Date: Jan. 19, 2006

(65) Prior Publication Data
US 2007/0238418 A1    Oct. 11, 2007

(30) Foreign Application Priority Data
Jul. 9, 2004    (JP) ............................. 2004-203033

(51) Int. Cl.
H04B 7/00    (2006.01)
(52) U.S. Cl. ...................... 455/522; 455/67.11; 455/68; 455/69
(58) Field of Classification Search .................. 455/522, 455/67.11, 68–70, 115.3, 126, 127.1, 127.2, 455/135, 226.3, 277.2, 296; 370/318

See application file for complete search history.

(56) References Cited

U.S. PATENT DOCUMENTS

| | | | | |
|---|---|---|---|---|
| 7,317,931 B2* | 1/2008 | Guo | ............................ | 455/522 |
| 7,369,621 B2* | 5/2008 | Yoshii et al. | ................. | 375/261 |
| 2004/0090929 A1* | 5/2004 | Laux et al. | ................... | 370/311 |
| 2004/0106407 A1* | 6/2004 | Kikuma et al. | .............. | 455/436 |
| 2004/0202113 A1* | 10/2004 | Moon et al. | .................. | 370/252 |
| 2009/0143073 A1* | 6/2009 | Hovers et al. | ............. | 455/452.2 |

FOREIGN PATENT DOCUMENTS

| | | |
|---|---|---|
| JP | 6-505108 | 6/1994 |
| JP | 11-213111 | 8/1999 |
| JP | 2003-243917 | 8/2003 |
| JP | 2004-222198 | 8/2004 |
| JP | 2005-20158 | 1/2005 |

* cited by examiner

Primary Examiner—Duc Nguyen
Assistant Examiner—Dominic E Rego
(74) Attorney, Agent, or Firm—Oblon, Spivak, McClelland, Maier & Neustadt, L.L.P.

(57) ABSTRACT

Receiving sensitivity deterioration in wireless communication due to a spurious radiation wave generated from a card reader/writer is suppressed in a case where a mobile phone terminal is provided with a contactless IC card reader/writer or a contactless IC card. The mobile phone terminal provided with the contactless IC card reader/writer performs measurement of a wireless status upon reception (step S1) and transmission power wetting (step S2), and when an instruction to start a reader/writer function is inputted from a user (step S3), wireless status deterioration due to spurious radiation from the reader/writer is predicted (step S4). Then, the mobile phone terminal judges whether control to reduce the transmission speed is necessary or not, on the basis of a value of the deterioration predicted wireless status (step S5), and when judged necessary, the transmission speed is reduced (step S6).

15 Claims, 14 Drawing Sheets

MOBILE WIRELESS COMMUNICATION TERMINAL AND MOBILE WIRELESS COMMUNICATION SYSTEM

TECHNICAL FIELD

The present invention relates to a mobile wireless communication terminal provided with a contactless communication function such as, for example, a contactless IC card reader/writer function or a contactless IC card function, and a mobile wireless communication system including the mobile wireless communication terminal and a base station.

BACKGROUND ART

In recent years, a so-called contactless IC card has become popular as a ticket for a train and a prepaid card, taking advantages of user-friendliness for a user, excellent durability, concurrent accessibility to a plurality of cards, ease of maintenance, etc.

In a case where these contactless IC cards approach a dedicated reader/writer (contactless IC card reader/writer) connected to a network, the reader/writer performs writing, erasing, updating, etc. of data stored inside.

Further, recently it has been considered to provide a function of the contactless IC card in a mobile phone terminal which is an example of the mobile wireless communication terminal, and it is thought that new services, such as electronic banking etc. may be offered by providing the mobile phone terminal with the contactless IC card Function.

Furthermore, Japanese Patent Application Publication (KOKAI/No. H11-213111 proposes to provide the mobile phone terminal with the contactless IC card reader/writer.

Incidentally, since the contactless IC card is supplied with energy by an alternating magnetic field of carrier waves which is generated by a reader/writer, such as 13.56 MHz etc., a nonlinear element, such as a diode is connected to an antenna for the IC card. Thus, in the case where the nonlinear element is connected to the antenna for IC card, if communications are performed between the contactless IC card and the reader/writer, high order harmonics in the carrier waves, such as 13.56 MHz etc., may take place.

Further, a communication distance of a proximity-type contactless IC card is a very short distance, as short as approximately 10 cm. Thus, in a case where a mobile phone terminal is provided with a contactless IC card reader/writer and a contactless IC card communicates with the reader/writer provided for the mobile phone terminal, the high order harmonics of the carrier wave generated by the reader/writer, and a mixture wave (spurious radiation wave) of the high order harmonics of the carrier wave and a mobile-phone terminal transmission wave may become disturbance waves in a reception bandwidth of the mobile phone terminal. As a result, there is a problem that receiving performances of the mobile phone terminal may deteriorate.

Especially, in the case where the contactless IC card reader/writer is provided for the mobile phone terminal, it is conceivable that the mobile phone terminal may be used as means for communicating with a server which manages fee charging information etc. when writing the fee charging information etc. into an external contactless card. For this reason, communication quality of the mobile phone terminal at the time of using the contactless IC card reader/writer function is required to be of high quality.

As examples In which the disturbance wave is generated in a reception band of a mobile phone terminal, a mobile phone system in a W-CDMA (Wideband-Code Division Multiple Access) system currently used in Japan and a mobile phone system of a cdma2000 system will be described typically hereafter. In addition, these two systems use a full-duplex system in which transmission and reception are simultaneously carried out, and they have a mechanism for generating the disturbance wave in the reception band even if any radio channel is selected at the time of communications.

Firstly a mobile phone system of the W-CDMA system will be described.

The mobile phone system of the W-CDMA system is a system in which a base station transmission frequency (or, mobile phone terminal reception frequency) is 2130 MHz-2170 MHz, a mobile-phone terminal transmission frequency (or, base station reception frequency) is 1940 MHz-1980 MHz, a transmission/reception frequency interval is 190 MHz, and a bandwidth is 3.84 MHz. The transmission and reception are fundamentally in full-duplex.

The mobile-phone terminal reception frequency and the mobile-phone terminal transmission frequency can be expressed by the following equation (1). In addition, in equation (1), Fwdc represents a mobile-phone terminal reception career frequency, and Fwtc represents a mobile-home terminal transmission career frequency.

$$Fwdc = Fwtc + 190 \text{ MHz} \tag{1}$$

In a case where the mobile-phone terminal transmission wave is inputted into the contactless IC card reader/writer, a contactless IC card reader/writer transmission wave and the mobile-phone terminal transmission wave are mixed due to nonlinear characteristics of a circuit element provided for the contactless IC card reader/writer. As a result, a spurious radiation wave is generated in a frequency range of the following equation (2). In addition, in equation (2), Ficn represents a spurious radiation-wave frequency range of the contactless IC card reader/writer, Fwtc represents a mobile-phone terminal transmission career frequency, Fwtd represents a mobile-phone terminal transmission frequency width, Fict represents a contactless IC card reader/writer transmission frequency, and p is a positive integer.

$$Ficn = Fwtc \pm Fwtd/2 \pm Fict \times p \tag{2}$$

Further, in view of a case where the contactless IC card reader/writer transmission frequency is 13.56 MHz and further p of equation (2) is 14, the spurious radiation-wave frequency range Ficn of the contactless IC card reader/writer is expressed by the following equation (3).

$$Ficn = Fwtc \pm 1.92 \text{ MHz} + 13.56 \text{ MHz} \times 14 \tag{3}$$
$$= Fwtc + 189.84 \text{ MHz} \pm 1.92 \text{ MHz}$$

where, the spurious radiation wave of the contactless IC card reader/writer expressed by this equation (3) is close to the reception career frequency of the mobile phone terminal of the W-CDMA system as explained with regard to equation (1). Further, in considering that the mobile-phone terminal reception bandwidth of the W-CDMA system is 3.84 MHz, the spurious radiation wave of the contactless IC card reader/writer falls within the reception band of the mobile phone terminal of the W-CDMA system. In other words, assuming that the transmission frequency of the mobile phone terminal of the W-CDMA system is 1940 MHz, for example, as shown in FIG. 13 he fourteenth order harmonic of the carrier wave of the contactless IC card reader/writer generates noise in a band of 1940 MHz±1.92 MHz+14*13.56 MHz=2129.84±1.92 MHz 2127.92 MHz to 2131.76 MHz). This noise component falls within a reception band of 2130 MHz±1.92 MHz of the mobile-phone terminal reception frequency.

Therefore, in a case where the mobile phone terminal of the W-CDMA system carries out transmission when transmission is performed by the contactless IC card reader/writer and, reception sensitivity of the mobile phone terminal is degraded in every radio channel and a call may be disconnected in the worst case.

Next, the case of the mobile phone system of the cdma2000 system will be described.

The mobile phone system of the cdma2000 system is a system in which the base station transmission frequency (or, mobile-phone terminal reception frequency) is 832 MHz-870 MHz, the mobile phone terminal transmission frequency (or, base station reception frequency) is 887 MHz-925 MHz, the transmission/reception frequency interval is 55 MHz, and the bandwidth is 1.23 MHz. The transmission and reception are fundamentally in full-duplex.

The mobile-phone reception frequency and the mobile-phone transmission frequency can be expressed by the following equation (4). In addition, in equation (4), Fcdc represents a mobile-phone reception career frequency, and Fctc represents a mobile-phone transmission career frequency.

$$Fcdc = Fctc - 55 \text{ MHz} \tag{4}$$

In this cdma2000 system, in a case where the mobile-phone terminal transmission wave is inputted into the contactless IC card reader/writer, the contactless IC card reader/writer transmission wave and the mobile-phone terminal transmission wave are mixed due to the nonlinear characteristics of the circuit element of the contactless IC card reader/writer. As a result, the spurious radiation wave is generated in a frequency range of the following equation (5). It is noted that, in equation (5), Ficn represents a spurious radiation-wave frequency range of the contactless IC card reader/writer, Fctc represents a mobile-phone terminal transmission career frequency, Fctd represents a mobile-phone terminal transmission frequency width, Fict represents a contactless IC card reader/writer transmission frequency, and p is a positive integer.

$$Ficn = Fctc \pm Fctd/2 \pm Fict \times p \tag{5}$$

Further, in view of a case where the contactless IC card reader/writer transmission frequency is 13.56 MHz and further p of equation (5) is 4, the spurious radiation-wave frequency range Ficn of the contactless IC card reader/writer is expressed by the following equation (6).

$$\begin{aligned} Ficn &= Fctc \pm 0.615 \text{ MHz} - 13.56 \text{ MHz} \times 4 \\ &= Fctc - 54.24 \text{ MHz} \pm 0.615 \text{ MHz} \end{aligned} \tag{6}$$

where, the spurious radiation wave of the contactless IC card reader/writer expressed by this equation (6) is close to the reception career frequency of the mobile phone terminal of the cdma2000 system as explained with regard to equation (4). Furthers when considering that the mobile-phone terminal reception bandwidth of the cdma2000 system is 1.23 MHz, the spurious radiation wave of the contactless IC card reader/writer falls within the reception band of the mobile phone terminal of the cdma2000 system. In other words, assuming that the transmission frequency of the mobile phone terminal of the cdma2000 system is 898 MHz, for example, as shown in FIG. 14 the fourth order harmonic of the carrier wave of the contactless IC card reader/writer generates noise in a band of 989 MHz±0.615 MHz−4* 13.56 MHz=843.76±0.615 MHz (843.14 MHz-844.38 MHz) band.

This noise component fails within a reception band of 843 MHz±0.615 MHz of the mobile-phone terminal reception frequency.

Therefore, in a case where the mobile phone terminal of the cdma2000 system carries out the transmission when the transmission is performed by the contactless IC card reader/writer, the reception sensitivity of the mobile phone terminal is degraded in every radio channel and the call may be disconnected in the worst case.

The present invention is proposed in view of such conditions, and aims to provide, in a case where a mobile wireless communication terminal provided with a contactless IC card reader/writer function or a contactless IC card function, the mobile wireless communication terminal capable of ameliorating degradation in reception sensitivity at the time of the wireless communications produced by the spurious radiation wave generated from the contactless IC card reader/writer and its mobile wireless communication system.

DISCLOSURE OF THE INVENTION

The mobile wireless communication terminal of the present invention is a terminal having a contactless communication function to perform contactless communication by using a carrier wave of a predetermined frequency, which solves the above-mentioned problems by having communication means for performing wireless communications with a base station by using a frequency band overlapped at least in part by a spurious radiation wave frequency range resulting from the carrier wave of the predetermined frequency transmission power setup means for setting up signal transmission power according to an instruction from the base station, reception intensity measurement means for measuring signal reception intensity at the time of the wireless communications with the base station, reception quality information generation means for generating information representing a reception quality of the terminal based on the signal reception intensity, noise power estimation means for estimating noise power of the spurious radiation wave with respect to a frequency band used for the wireless communications with the base station on the basis of the signal transmission power, the signal reception intensity, and a coefficient inherent to the terminal, detection means for detecting at least that the contactless communication function is started, and control means for comparing a predetermined threshold value with the reception quality taking account of the estimated noise power of the spurious radiation wave when detecting that the contactless communication function is started and for controlling the communication means to lower a transmission speed when the reception quality is equal to or less than the predetermined threshold value.

Further the mobile wireless communication terminal of the present invention is a terminal having a contactless communication function to perform contactless communication by using a carrier wave of a predetermined frequency which solves the above-mentioned problems by having communication means for performing wireless communications with a base station by using a frequency band overlapped at least in part by a spurious radiation wave frequency range resulting from the carrier wave of the predetermined frequency, detection means for detecting at least that the contactless communication function is started and control means for generating a predetermined signal when detecting that the contactless communication function is started, and for controlling the communication means to lower a transmission speed when receiving an instruction to lower the transmission speed from the base station after transmitting the predetermined signal to the base station.

Further, the mobile wireless communication system of the present invention is a system which includes a mobile wireless communication terminal having a contactless communication function to perform contactless communication using a carrier wave of a predetermined frequency and a base station for performing wireless communications with the mobile wireless communication terminal and which performs wireless communications between the mobile wireless communication terminal and the base station by using a frequency band overlapped at least in part by a spurious radiation wave frequency range resulting from the carrier wave of the predetermined frequency, which solves the above-mentioned problems by the steps that the mobile wireless communication terminal generates a predetermined signal to be transmitted to the base station when detecting that the contactless communication function is started the base station judges whether it is necessary to lower the transmission speed used for the wireless communications based on the predetermined signal from the mobile wireless communication terminal and transmits an instruction to lower the transmission speed to the mobile wireless communication terminal when it judges that t necessary to lower the transmission speed and the mobile wireless communication terminal lowers the transmission speed when receiving the instruction to lower the transmission speed.

Here, if the transmission speed is reduced, the transmission power decreases If the transmission power decreases, the noise power of the spurious radiation wave with respect to the frequency band used for the wireless communications with the base station is also reduced. Therefore, according to the present invention, in a case where it is detected that the contactless communication function is started, the transmission speed is reduced to lower the transmission power so that the spurious radiation wave by use of the contactless communication function may not adversely affect the reception sensitivity of the mobile wireless communication terminal.

According to the present invention, in the case where it is detected that the contactless communication function is started, by reducing the transmission speed and lowering the transmission power it is possible to ameliorate the reception sensitivity degradation at the time of the wireless communications which is produced by the spurious radiation wave generated from the contactless IC card reader/writer, in the case where the mobile wireless communication terminal is provided with the contactless IC card reader/writer function or the contactless IC card function, for example.

BEST MODE FOR IMPLEMENTING THE INVENTION

Figure 1:
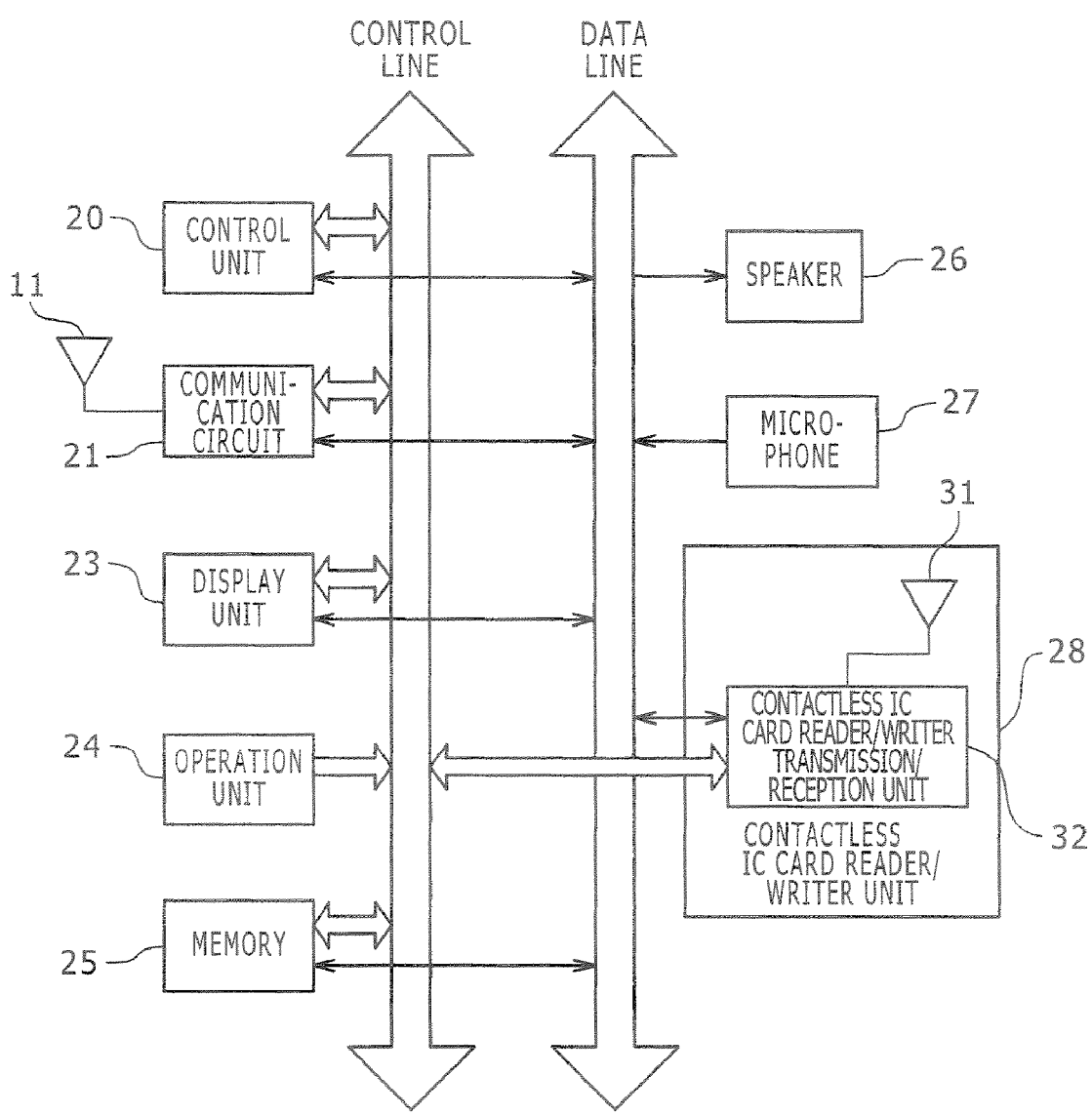
FIG. 1 is a block diagram showing a schematic terminal structure of a mobile phone terminal of a first embodiment of the present invention.

Hereafter, referring to the drawings, an embodiment of a mobile wireless communication terminal and a mobile wireless communication system of the present invention will be described. In addition, as one embodiment of the present invention, the following description exemplifies mobile phone systems and mobile phone terminals of a W-CDMA system and a cdma2000 system. Of course, the contents described here are examples only, and the present invention is not limited to the examples.

In the mobile phone system of the present embodiment according to the present invention, in the case where the wireless communications are carried out by the W-CDMA system or the cdma2000 system, when starting the contactless IC card reader/writer function or the contactless IC card function, it is estimated, from reception intensity (reception power) of a reception frequency band measured by the mobile phone terminal and signal transmission power to be set up by the mobile phone terminal under control of the base station, to what extent sensitivity degradation takes place in the reception frequency band of the mobile phone terminal as the contactless IC card reader/writer function or a contactless IC card function is used. For example, when it is estimated that sensitivity degradation with the possibility that the call may be disconnected may take place, a transmission speed is reduced to be less than the current one so as to lower the transmission power thus being able to prevent reception sensitivity from being degraded by a spurious radiation wave.

First Embodiment of the Invention

In the mobile phone system of a first embodiment of the present invention, in a case where the wireless communications by the W-CDMA system or the cdma2000 system are being performed, when starting the contactless IC card reader/writer function, it is arranged to lower the transmission power, as will be described below, so as to avoid the reception sensitivity degradation of the mobile phone terminal caused by the spurious radiation wave of the contactless IC card reader/writer. In addition, as for the first embodiment, the mobile phone terminal provided with the contactless IC card reader/writer function will be described by way of example.

As will be described more specifically in the case where the mobile phone terminal of the first embodiment of the present invention is performing the wireless communications by the W-CDMA, system or the cdma2000 system, when starting the contactless IC card reader/writer function, it is estimated, in advance of the start, to what extent the sensitivity degradation takes place in the reception frequency band of the mobile phone terminal due to the spurious radiation wave of the contactless IC card reader/writer. In other words, the mobile phone terminal can estimate the electric power of the spurious radiation wave of the contactless IC card reader/writer on the basis of the transmission power which is set up by itself. Further, the mobile phone terminal compares the electric power of the spurious radiation wave with the reception power measured by itself, so that it can estimate to what extent the sensitivity degradation takes place in the reception frequency band of the mobile phone terminal.

Here, the electric power of the spurious radiation wave can be estimated by carrying out operation, such as for example, the Following equation (7) In addition, n equation (7), Eicn is electric power of the spurious radiation wave of the contactless IC card reader/writer, Et is the transmission power of the mobile phone terminal, and "n" is a constant. By constant "n" is meant a value which is inherent to a terminal and determined by isolation between the contactless IC card antenna of the mobile phone terminal and the antenna of the mobile phone terminal etc.

$$Eicn = Et - n \quad (7)$$

Further, the mobile phone terminal is specified to report a wireless status periodically to a base station, and has a function to measure the reception intensity (reception power) of a radio channel. Examples of values which indicate the wireless status reported to the base station are CPICH (Common Pilot Channel) RSCP (Received Signal Code Power), CPICH Ec/Io (total sum of transmission levels of pilot channel of neighboring base station/transmission levels between current base station and next base station), RSSI (Received signal strength indicator), etc in the mobile phone system of the W-CDMA system.

By comparing the electric power of the spurious radiation wave estimated by way of the calculating operation of the equation (7), with the reception power measured by the mobile phone terminal itself, the mobile phone terminal of the present embodiment estimates to what extent the sensitivity degradation takes place in the reception frequency band of the mobile phone terminal, or estimates the degradation of the wireless status due to the noise of the spurious radiation wave.

For example, in a case where it is estimated that the reception sensitivity degradation with a possibility that the call may be disconnected may take place, the mole phone terminal reduces the transmission speed to be less than the current one so as to lower the transmission power under power control by the whole network. In other words, as can be seen from equation (7), since the power of the spurious radiation wave decreases with decreasing transmission power of the mobile phone terminal, when it is estimated that the reception sensitivity degradation may take place, the transmission speed is reduced to lower the transmission power to be less than the current one, thus preventing the reception sensitivity from being degraded by the spurious radiation wave.

In the first embodiment of the present invention, in order to lower the transmission power as described above, the following techniques are used.

In the case of the mobile phone system of the W-CDMA system or the cdma2000 system, electric power control with respect to the mobile phone terminal is performed finely. In other words in these mobile phone systems a status of electromagnetic wave propagation changes as a position of the mobile phone terminal is changed by movement of a user, for example, and along therewith, reception field intensity changes in time to generate fading. In order to avoid electric power change caused by the fading, the electric power control with respect to the mobile phone terminal is performed finely. Further, in these mobile phones system a lot of mobile phone terminals communicate using the same frequency. For example, in a case where electric power of an electromagnetic wave from a specific terminal is stronger than electric power of an electromagnetic wave from another terminal the electromagnetic wave of the weaker electric power is masked by -he electromagnetic wave of the stronger electric power, so that a signal cannot be receive In order to avoid this, the electric power control with respect to the mobile phone terminal is performed finely.

In the mobile phone systems of the W-CDMA system and the cdma2000 system, the electric power control with respect to the mobile phone terminals is performed by the base station in fact. More specifically, the base station controls the transmission power of each mobile phone terminal so that a ratio between the signal power after despreading a signal sent from each mobile phone terminal and noise power by way of the fading, masking, etc. may be equal, or so that the ratio of the noise power to the signal power does not exceed a certain value.

Incidentally, for example, in a case where spread rates are the same, the signal power after the despreading increases with decreasing transmission speed. Therefore, the transmission power of the mobile phone terminal is controlled to decrease with decreasing transmission speed.

Hereafter, a relationship between the transmission power and the transmission speed in power control of the mobile phone terminal of the W-CDMA system and the cdma2000 system will be described.

In the mobile phone system of the W-CDMA system or the cdma2000 system, the base station performs transmission power control by sending an up/down control signal for the transmission cower to the mobile phone terminal so that a desired reception quality may be obtained.

Further, a reception quality Eb/I0 can be expressed by the following equation (8). In addition, in equation (8), Eb, I0, SF, K, σn, and S respectively represent the signal power per bit in each channel, a spectral density of interference power by another channel, the spread rate (spread signal band of desired wave/transmission signal band of desired wave, the number of users, background thermal noise distribution, and signal power.

$$Eb/Io = SF/\{(K-1)+(\text{squared } \sigma n)/S\} \quad (8)$$

The base station is controlled to increase the transmission signal power S of the mobile phone terminal, in a case where the reception quality Eb/I0 calculated by this equation (8) is less than a desired value Here, if the transmission speed is reduced (or if the transmission signal band is narrowed) the spread rate SF in equation (8) increases. As a result, the transmission signal power S required for maintaining the same reception quality decreases. In other words, the electric power control is carried out such that the lower the transmission speed of the mobile phone terminal is, the smaller the transmission power of the terminal is.

In addition, in the mobile phone system of the W-CDMA system or the cdma2000 system, selection of a desired transmission speed out of a plurality of transmission speeds as necessary is made possible. For example, in a case of the cdma2000 1×Ev/Do system, 153.6 kbps, 38.4 kbps, 19.2 kbps, and 9.6 kbps are prepared as the transmission speeds for a data channel, and selection of the desired transmission speed from them is made possible.

As with the above description in the mobile phone system of the present embodiment, when it is estimated, by way of the calculating operation of the equation (7), that the reception sensitivity degradation may take place, and, in a case where, for example, it is estimated that the reception sensitivity degradation with the possibility that the call may be disconnected may take place, the transmission speed which is less than the current one is selected out of the plurality of transmission speeds, to lower the transmission power under power control by the whole network, to thereby prevent the reception sensitivity degradation by the spurious radiation wave.

Internal Structure of Mobile Phone Terminal of First Embodiment

Hereafter, a schematic internal structure of the mobile phone terminal of the first embodiment according to the present invention will be described with reference to FIG. 1.

An antenna 11 is, for example, a built-in antenna, and transmits and receives the signal wave for a telephone call or packet communication. Further, a first communication circuit 21 performs frequency conversion, modulation, demodulation, etc. of a transmission/reception signal.

Data received by the communication circuit 21, for example a telephone call voice data, are sent to a control unit 20 through a data line. The control unit 20 includes a CPU (central processing unit), decodes the telephone call voice data, and sends the voice data after the decoding to a speaker 26 through the data line.

The speaker 26 is equivalent to a speaker for receiving a call, or a speaker for ringer, includes a digital/analog converter and an amplifier, and digital/analog converts, amplifies, then outputs the data for the telephone call sound or the ringer sound, thereby the telephone call sound and the ringer sound are obtained.

A microphone 27 is a microphone for transmission and includes an analog/digital converter and an amplifier After a telephone call voice signal inputted through this microphone 27 is amplified to a predetermined level by the amplifier, it is converted into digital voice data by an analog/digital converter. After being sent through the data line to the control unit 20 and coded, the converted digital voice data is sent to the communication circuit 21.

A display unit 23 is constituted by, for example, a liquid crystal display provided on a not-shown housing of the mobile phone terminal, a drive circuit for displaying an image etc. on the liquid crystal display, etc.

An operation unit 24 has numeral keys and a jog dial provided on the not-shown housing of the mobile phone terminal, and an operation signal generation unit for generating an operation signal corresponding to operations for them, etc.

A memory 25 includes a ROM (Read Only Memory) and a RAM (Random Access Memory) The ROM stores a control program and various types of initial-setup values with which the control unit 20 controls each part, font data, dictionary data, program codes for performing the calculating operation of estimating the degradation of the wireless status due to the noise of the spurious radiation wave in the present embodiment, a process of selecting and setting the transmission speed to be used, a process of exchanging various data with the base station, control of the contactless 7C card reader/writer function, etch program codes for the applications for creating, editing, etc an E-mail, program codes for applications for performing various processes with respect to a picture, other program codes for various types of applications provided for the mobile phone terminal, identification information (ID) on the mobile phone terminal, etc. This ROM includes a rewritable ROM, such as EEPOM (Electrically Erasable Programmable Read-Only Memory), and arranged to be able to store e-mail data, a telephone directory and e-mail address which are set up by the user, photograph data and ringer tone data which are downloaded, character data, registration data of candidate words for prediction conversion, study data for the prediction conversion information on a coefficient and a constant used for calculation operation for estimating the degradation of the wireless status due to the noise of the spurious radiation wave, and others including various types of user setup values etc. The RAM stores data as workspace when the control unit 20 performs various types of data processes, as needed.

A contactless IC card reader/writer unit 28 is built in the mobile phone terminal, and is provided with an antenna 31 and a transmission/reception unit (contactless IC card reader/writer transmission/reception unit) 32 for communicating with a not-shown external contactless IC card.

Besides coding and decoding the telephone call voice data the control unit 20 performs various types of calculation operations, such as control of each constituent element of the mobile phone terminal, through a control line. Especially in the case of the present embodiment, the control unit 20 performs various processes, such as the calculation operation for estimating the degradation of the wireless status due to the noise of the spurious radiation wave, the process or selecting and setting the transmission speed to be used, the process of exchanging various data with the base station, and operation control etc. of the contactless IC card reader/writer unit 28.

In addition, although not shown in FIG. 1, the mobile phone terminal of the present embodiment is also provided with a power supply circuit for supplying electric power to each part, a record/playback unit for recording and playing back music or a picture, a browser function, a connector for external cables, a connector for connecting an external remote controller, a GPS (Global Positioning System) communications unit which is a positioning device for detecting a current position of the mobile phone terminal, and its antenna, and a camera unit having a lens system, an autofocus mechanism for automatically focusing the lens system, and an imaging device.

Flow of Transmission Speed Setup Process in First Embodiment

Hereafter, a flow in the mobile phone terminal of the mobile phone system of the first embodiment, when the terminal is, for example, engaged (busy), communicating data, or waiting in the area, from when an instruction to start the contactless IC card reader/writer function is inputted Into the mobile phone terminal until the transmission speed is changed will be described with reference to a structure of FIG. 1 by using a flow chart of FIG. 2.

Figure 2:
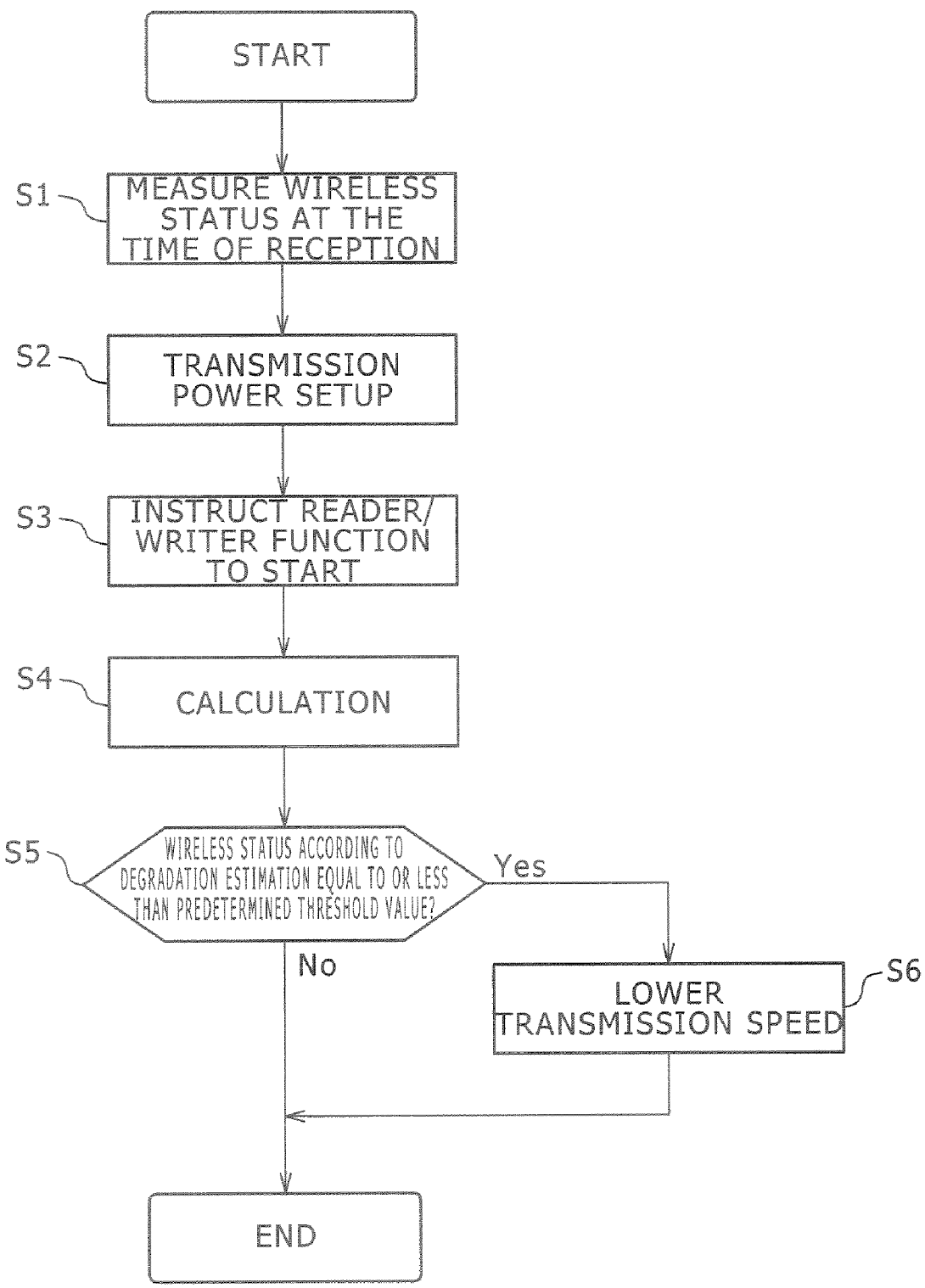
FIG. 2 is a flow chart showing a flow from when an instruction to start a contactless IC card reader/writer function is inputted into the mobile phone terminal until control of lowering a transmission speed is performed in the mobile phone system of the first embodiment.

In FIGS. 1 and 2, when the mobile phone terminal is engaged, communicating data, or waiting in the area, the control unit 20 measures, as shown in step 51, a wireless status measured at the time of the reception by using the antenna 11 and the communication circuit 21, and periodically transmits a value which shows the wireless status to the base station. Further, as shown in step S2 the control unit 20 of the mobile phone terminal sets up the transmission power at the time of communication by the communication circuit 21 on the basis of the transmission power control by the base station.

Here, when the mobile phone terminal is engaged, communicating data, or waiting in the area, as in above, assuming that the instruction to start the contactless IC card reader/writer function is inputted by the user through the operation unit 24 as shown in step S3 for example, the control unit 20 of the mobile phone terminal will detect it. Further the control unit 20 at this time estimates the degradation of the wireless status due to the noise of the spurious radiation wave from the contactless IC card reader/writer unit 28, by calculating the equation (7) using the wireless status at the time of the reception measured by using the antenna 11 and the communication circuit 21 (as shown in step S4), and the transmission power set up by the control unit 20 through the communication circuit 21. In other words, the control unit 20 estimates the degradation of the wireless status by calculating the equation (7) using the wireless status and transmission power and the constant n inherent to the terminal of the equation (7) stored in the memory 25.

Then, in step S5, the control unit 20 of the mobile phone terminal determines whether or not the value indicating the wireless status is equal to or less than a predetermined threshold value. When it is determined in step S5 that the value indicating the wireless status is greater than the predetermined threshold value, the control unit 20 terminates the processing in the flow chart of this FIG. 2. On the other hand, when it is determined that the value indicating the wireless status is equal to or less than the predetermined threshold value, it moves the processing to step S6.

Moving the processing to step S6, the control unit 20 selects a transmission speed lower than the present transmission speed to reduce the transmission speed. As a result, the transmission power is reduced by the power control controlled by the whole network, and it is possible to prevent the reception sensitivity degradation due to the spurious radiation wave at the time of performing the contactless IC card reader/writer function.

Then, the control unit 20 starts the contactless IC card reader/writer unit 28, and causes the contactless IC card reader/writer unit 28 to perform communications with the external contactless IC card.

Conclusion of First Embodiment

As described above, according to the mobile phone system of the first embodiment of the present invention, when it is estimated that the reception sensitivity degradation may take place due to the spurious radiation wave, generation of the reception sensitivity degradation due to the spurious radiation wave at the time of using the contactless IC card reader/writer can be prevented by lowering the transmission speed and reducing the transmission power.

Second Embodiment

In the first embodiment, when it is estimated that the reception sensitivity degradation may take place due to the spurious radiation wave, the mobile phone terminal itself lowers the transmission speed, but it is also possible, like the following second embodiment, to lower the transmission speed under control of the base station. In addition, the internal structure of the mobile phone terminal of the second embodiment is substantially the same as that in FIG. 1, and the description will be omitted.

Hereafter, a flow in the mobile phone system of the second embodiment of the present invention, when the mobile phone terminal is engaged or waiting in the area, from when the instruction to start the contactless IC card reader/writer function is inputted into the mobile phone terminal until transmission speed is lowered will be described with reference to FIG. 1 using a time arrow of FIG. 3.

Figure 3:
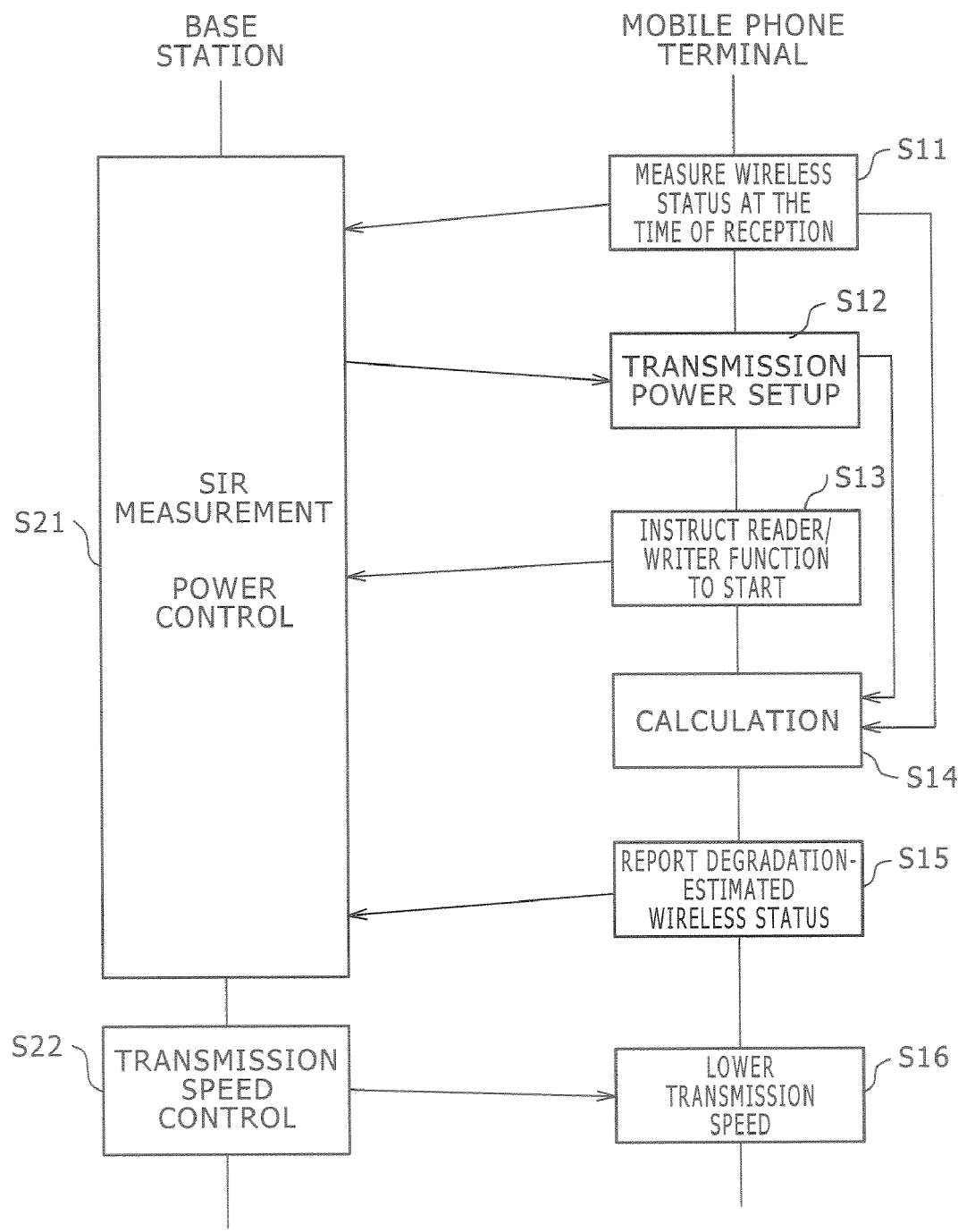
FIG. 3 is a time arrow showing a flow from when the instruction to start the contactless IC card reader/writer function is inputted into the mobile phone terminal until control of lowering the transmission speed is performed in the mobile phone system of a second embodiment.

In FIGS. 1 and 3, while engaged or waiting in the area, as shown in step S11, the control unit 20 of the mobile phone terminal measures the wireless status of the reception frequency band measured using the antenna 11 and the communication circuit 21, and periodically transmits the value which shows the wireless status to the base station. Further, as shown in step S12, the control unit 20 of the mobile phone terminal sets up the transmission power at the time of communication by the communication circuit 21 on the basis of the transmission power control by the base station. On the other hand, the base station at this time measures an SIR (ratio of reception power of desired wave to interference signal power), and is performing the transmission power control of the base station based on the SIR value as shown in step S21.

Here, as shown in step S13, assuming that the instruction to start the contactless IC card reader/writer function is inputted by the user, for example through the operation unit 24 while engaged or waiting in the area, the control unit 20 of the mobile phone terminal detects it, and reports information showing that the instruction to start the contactless IC card reader/writer function is inputted to the base station. Further, as shown in step S14, the control unit at this time estimates the degradation of the wireless status due to the noise of the spurious radiation wave from the contactless IC card reader/writer unit 28, by calculating the equation (7) using the wireless status in the reception frequency band measured in step 11 and the transmission power set up in step S12. In other words, the control unit 20 estimates the degradation of the wireless status by calculating the equation (7) using the wireless status and transmission power and the constant n inherent to the terminal of the equation (7) stored in the memory 25. The control unit 20 of the mobile phone terminal reports the value which shows the wireless status to the base station through the communication circuit 21 and the antenna 11, as shown in step S15.

As described above, the base station having received information showing that the instruction to start the contactless IC card reader/writer function is issued and the value indicating the wireless status determines whether or not the control for lowering transmission speed is required in step S22. In other words, in a case where the base station determines that the reception sensitivity degradation due to the spurious radiation wave takes place when using the contactless IC card reader/writer function and good communication is not obtainable unless the transmission speed is not lowered, the base station instructs the mobile phone terminal to lower the transmission speed.

Being instructed to lower the transmission speed by the base station, the mobile phone terminal carries out the process of lowering the transmission speed, as shown in step S16. Then, the mobile phone terminal starts the contactless IC card reader/writer unit 28, and causes the contactless IC card reader/writer unit 28 to perform communications with the external contactless IC card.

Figure 4:
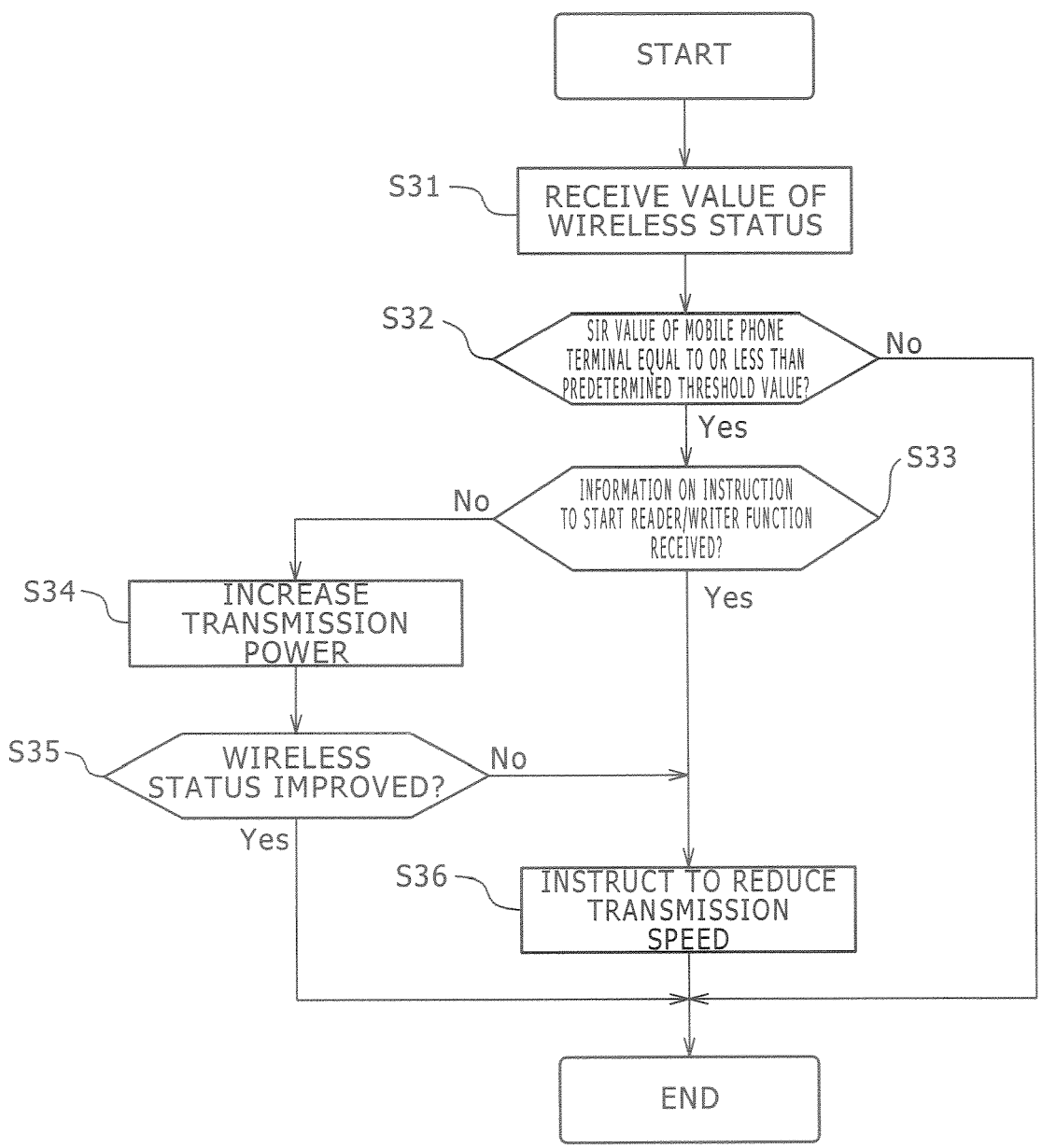
FIG. 4 is a flow chart showing in detail a process of determining whether or not the control of lowering the transmission speed is necessary in the base station of the mobile phone system of the second embodiment.

Details of Determination Process for Controlling Transmission Speed in Base Station FIG. 4 shows a detailed flow of the processing in the above steps S21 and S22 o FIG. 3 among the processes performed in the base station.

In FIG. 4, the base station receives the report of the value which shows the wireless status from the mobile phone terminal in step S31. Here, when the instruction to start the contactless IC card reader/writer function is inputted by the mobile phone terminal, the value which shows the wireless status becomes a value acquired by the degradation estimation using the calculation operation of the equation (7), or otherwise, on the other hand, it becomes a value usually reported.

Receiving the value which shows the wireless status is received in step S31, the base station determines, as the processing of step S32, whether or not the SIR value of the mobile phone terminal is equal to or less than the predetermined threshold value, in accordance with the value indicating the wireless status which is sent from the mobile phone terminal. Here, the above-mentioned predetermined threshold value is a value determined in advance as a threshold value for judging whether to instruct the mobile phone terminal to lower the transmission speed In a case where the above-mentioned SIR value is better (the value is higher) than the predetermined threshold value, the base station terminates the processing, judging that the control to lower the transmission speed is unnecessary.

On the other hand, in a case where it is judged in step S32 that the SIR value is equal to or less than the predetermined threshold value, the base station determines whether or not the information showing that the instruction to start the contactless IC card reader/writer function is issued is received from the mobile phone terminal in step S33.

Then, the base station moves the processing to step S36, in a case where it is determined in step S33 that the information on the instruction to start the contactless IC card reader/writer function is received. In a case where it is determined that the information on the instruction to start the contactless IC card reader/writer function is not received, it moves the processing to step S34.

In a case where it is determined in step S33 that the information of the instruction to start the contactless IC card reader/writer function is received and it moves the processing to step S36, the base station sends the instruction to lower the transmission speed to the mobile phone terminal. In other words, according to the present embodiment, in a case where it is determined that the SIR value based on the value of the wireless status sent from the mobile phone terminal is equal to or less than the predetermined threshold value, and when having recognized that a reason why the SIR value is equal to or less than the predetermined threshold value, or a reason for the degradation of the wireless status in the mobile phone terminal is the starting of the contactless card reader/writer function, the base station sends the instruction to lower the transmission speed to the mobile phone terminal. It 1s noted that, in the case of the present embodiment, unless it is determined in step S32 that the SIR value is equal to or less than the predetermined threshold value, the base station does not move the processing to step S33. For this reason, even if the base station has received the information on the instruction to start the contactless IC card reader/writer function, for example, from the mobile phone terminal, it does not send the instruction to lower the transmission speed to the mobile phone terminal in a case where the SIR value is not equal to or less than the predetermined threshold value (i.e., a case where the wireless status is not degraded on the terminal side).

On the other hand, in a case where it is determined in step S33 that the information on the instruction to start the contactless IC card reader/writer function is not received and the processing moves to step S34, the base station increases the transmission power, for example.

Next, in step S35, the base station determines whether or not the SIR value calculated from the wireless status newly sent from the mobile phone terminal in accordance with the instruction in the above-mentioned step S34 exceeds the above-mentioned predetermined threshold value, namely whether or not the wireless status is ameliorated by increasing the above-mentioned transmission power and increasing the reception power of the mobile phone terminal In a case where t is determined in the step S35 that the wireless status is ameliorated, the base station terminates the processing, judging that the control to lower the transmission speed is unnecessary. On the other hand, in a case where it is judged that the wireless status is nor ameliorated, it instructs the mobile phone terminal to lower the transmission speed in step S36.

Conclusion of Second Embodiment

As described above, according to the mobile phone system of the second embodiment of the present invention, in the case where the cause of degradation in the value of the wireless status is the starting of the contactless card reader/writer function, the reception sensitivity degradation due to the spurious radiation wave at the time of using the contactless IC card reader/writer function can be eliminated by performing the control to lower the transmission speed.

Further, according to the mobile phone system of this second embodiment even in the case where the contactless card reader/writer i s used by the mobile phone terminal, since the control to lower the transmission speed is not performed unless the value of the wireless status degrades, the increase in the load with respect to the mobile phone system due to execution of an unnecessary transmission speed change can be inhibited.

Third Embodiment

Next, the mobile phone system of a third embodiment in accordance with the present invention will be described.

As for the above mentioned second embodiment, the example is shown In which the information on the instruction to start the contactless IC card reader/writer function and the value of the wireless status are sent from the mobile phone terminal to the base station, while the base station side determines whether or not the transmission speed is to be lowered using these data. However, as in the third embodiment of the present invention, it may be arranged so that only the information on the instruction to start the contactless IC card reader/writer function is sent from the mobile phone terminal to the base station, while the base station side issues the instruction to invariably lower the transmission speed upon receiving the information.

Hereafter, a flow in the mobile phone system of the third embodiment of the present invention, when the mobile phone terminal is engaged or waiting in the area, from when the instruction to start the contactless IC card reader/writer function is inputted until the control for lowering the transmission speed is performed will be described, with reference to a time arrow of FIG. 5. In addition, the internal structure of the mobile phone terminal of the third embodiment is substantially the same as that of FIG. 1 and the description will be omitted. Further, the processing steps in FIG. 5 which are the same as those in FIG. 3 are given the same reference signs as in FIG. 3, and the description will be omitted.

Figure 5:
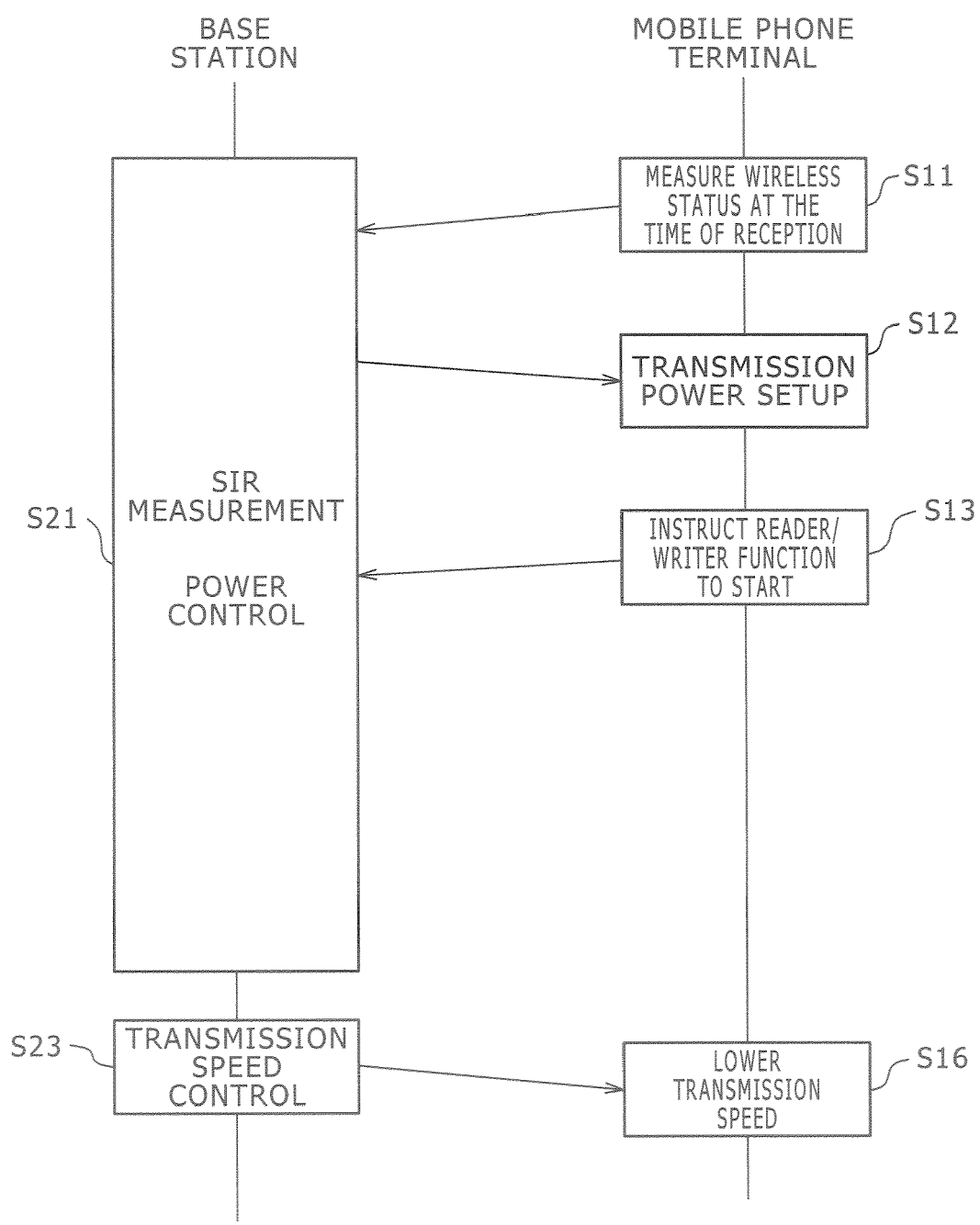
FIG. 5 is a time arrow showing a flow from when the instruction to start the contactless IC card reader/writer function is inputted into the mobile phone terminal until control of lowering the transmission speed is performed in the mobile phone system of a third embodiment.

In FIG. 5, as shown in step S13, he instruction to star, the contactless IC card reader/writer function is inputted from the operation unit 24 when the mobile phone is engaged or waiting in the area, the control unit 20 of the mobile phone terminal reports, to the base station, the information showing that the instruction to start the contactless IC card reader/writer function is issued It is noted that, in the case of the third embodiment, the mobile phone terminal does not send the degradation estimation of the wireless status as explained in the second embodiment and the value indicating the wireless status by the degradation estimation.

As described above, the base station having received the information on the instruction to start the contactless IC card reader/writer function from the mobile phone terminal determines in step S23 to control the transmission speed to be lowered, and transmits the instruction to lower the transmission speed to the mobile phone terminal.

Conclusion of Third Embodiment

According to the mobile phone system of the third embodiment of the present invention, since it is determined whether or not the transmission speed change is necessary only on the basis of whether or not the instruction to start the contactless IC card reader/writer function is inputted, and since it is arranged that the transmission speed is invariably lowered in the case where the instruction to start the contactless IC card reader/writer function is inputted the reception sensitivity degradation due to the spurious radiation wave of the contactless IC card reader/writer function can be eliminated certainly.

Further, according to the mobile phone system of the third embodiment, since it is not necessary for the mobile phone terminal side to perform the calculation operation for estimating the degradation of the wireless status, processing loads on the control unit 20 decrease. On the other hand, also in the base station side, determination whether or not the transmission speed is lowered may be carried out only based on whether or not the instruction to start the contactless IC card reader/writer function is inputted, thereby the processing loads decrease.

Fourth Embodiment

Next, the mobile phone system of a fourth embodiment in accordance with the present invention will be described.

In the fourth embodiment of the present invention, only the value of the wireless status found by the operation of the degradation estimation is sent from the mobile phone terminal to the base station. While, the base station side determines whether or not the transmission speed is lowered on the basis of the value of the wireless status.

Hereafter, a flow in the mobile phone system of the fourth embodiment of the present invention, when the mobile phone terminal is engaged or waiting in the area, from when the instruction to start the contactless IC card reader/writer function is inputted until the control for lowering the transmission speed is performed will be described with reference to a time arrow of FIG. 6. In addition, the internal structure of the mobile phone terminal of the fourth embodiment is substantially the same as that of FIG. 1 and the description will be omitted. Further, the processing steps in FIG. 6 which are the same as those in FIG. 3 are given the same reference signs as in FIG. 3, and the description will be omitted.

Figure 6:
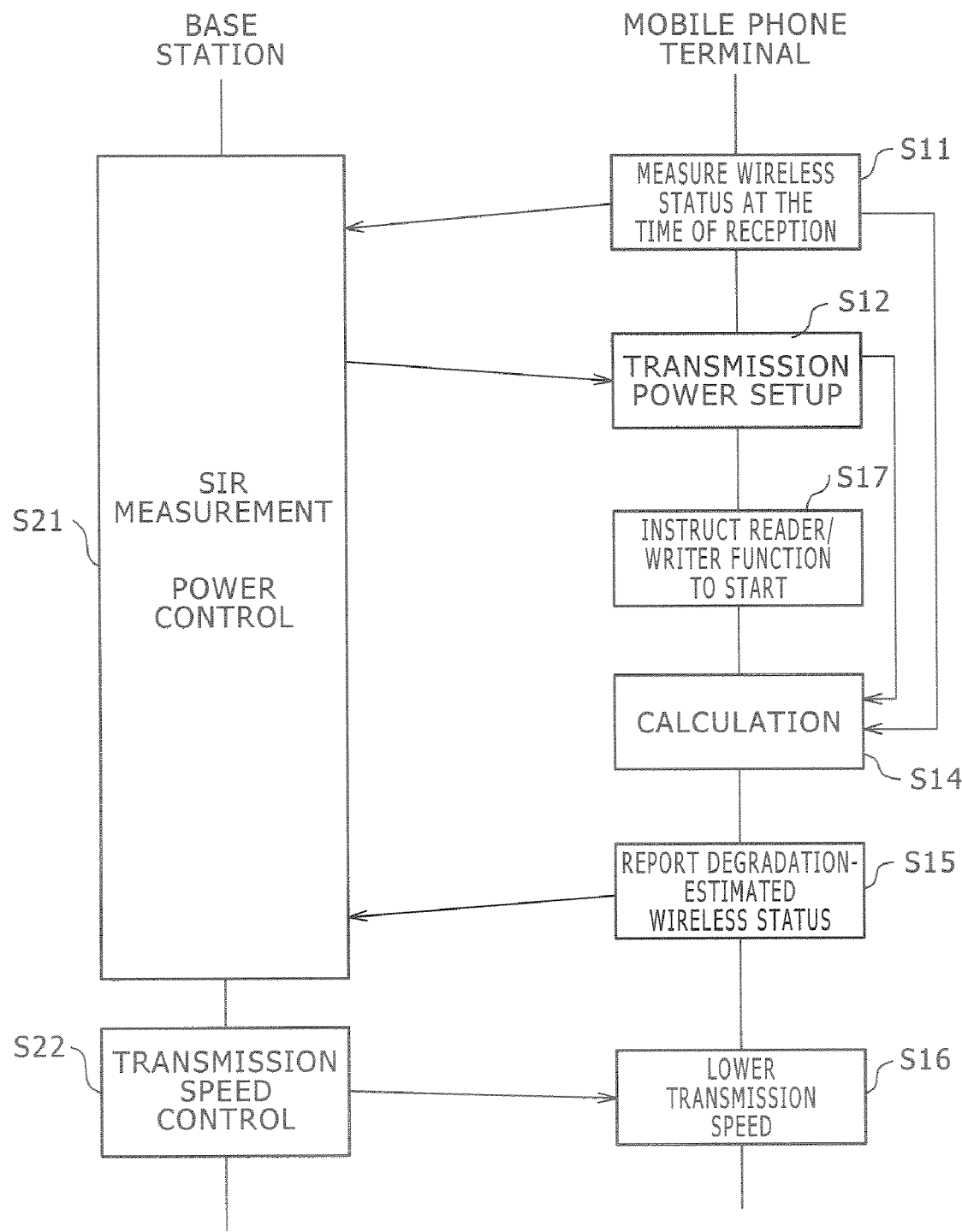
FIG. 6 is a time arrow showing a flow from when the instruction to start the contactless IC card reader/writer function is inputted into the mobile phone terminal unit control of lowering the transmission speed is performed in the mobile phone system of a fourth embodiment.

In FIG. 6, as shown in step S17, in a case where the instruction to start the contactless IC card reader/writer function is inputted from the operation unit 24 when the mobile phone terminal is engaged or waiting in the area, the control unit 20 of the mobile phone terminal moves the processing to step S14 immediately without reporting the information on the Instruction to start the contactless IC card reader/writer function to the base station. Then, in step S15, the control unit 20 of the mobile phone terminal reports, to the base station, the value of the wireless status found by the calculation operation of the degradation estimation as described above.

As described above, the base station having received the value of the wireless status from the mobile phone terminal determines in step S22 whether or not there is a need for the control for lowering the transmission speed on the basis of the SIR value calculated from the value indicating the wireless status and the predetermined threshold value. In other words, the base station in the case of this fourth embodiment, as described in step S32 of the FIG. 4 determines whether or not the SIR value is equal to or less than the predetermined threshold value. In a case where the SIR value is higher than the predetermined threshold value (the value of the wireless status is good), it terminates the processing, judging that the control for lowering the transmission speed is unnecessary. On the other hand, in a case where the SIR value is equal to or less than the predetermined threshold value and the wireless status worsens, the instruction to lower the transmission speed is sent to the mobile phone terminal.

Conclusion of Fourth Embodiment

According to the mobile phone system of the fourth embodiment of the present invention, when the value of the wireless status by the degradation estimation worsens, the reception sensitivity degradation due to the spurious radiation wave at the time of using the contactless IC care reader/writer function can be eliminated by performing the control for lowering the transmission speed.

Further, according to the mobile phone system of his fourth embodiment, since the mobile phone terminal side does not need to send the information on the instruction to start the contactless IC card reader/writer function to the base station the processing loads on the control unit 20 decrease. On the other hand, since it is not necessary for the base station side to determine whether or not there is a need for transmission speed change control by way of the information on the instruction to start the contactless IC card reader/writer function, thus reducing the processing loads.

Fifth Embodiment

As for the mobile phone systems of the first through fourth embodiments, the examples are shown in which the mobile phone terminal is provided with the contactless IC card reader/writer function. However, as for the fifth embodiment, an example is shown in which the mobile phone terminal is provided with the contactless IC card function.

Hereafter, a schematic internal structure of the mobile phone terminal in the fifth embodiment of the present invention will be described with reference to FIG. 7. In addition, constituent elements in FIG. 7 which are the same as those in FIG. 1 are given the same reference signs as in FIG. 1, and the description will be omitted.

Figure 7:
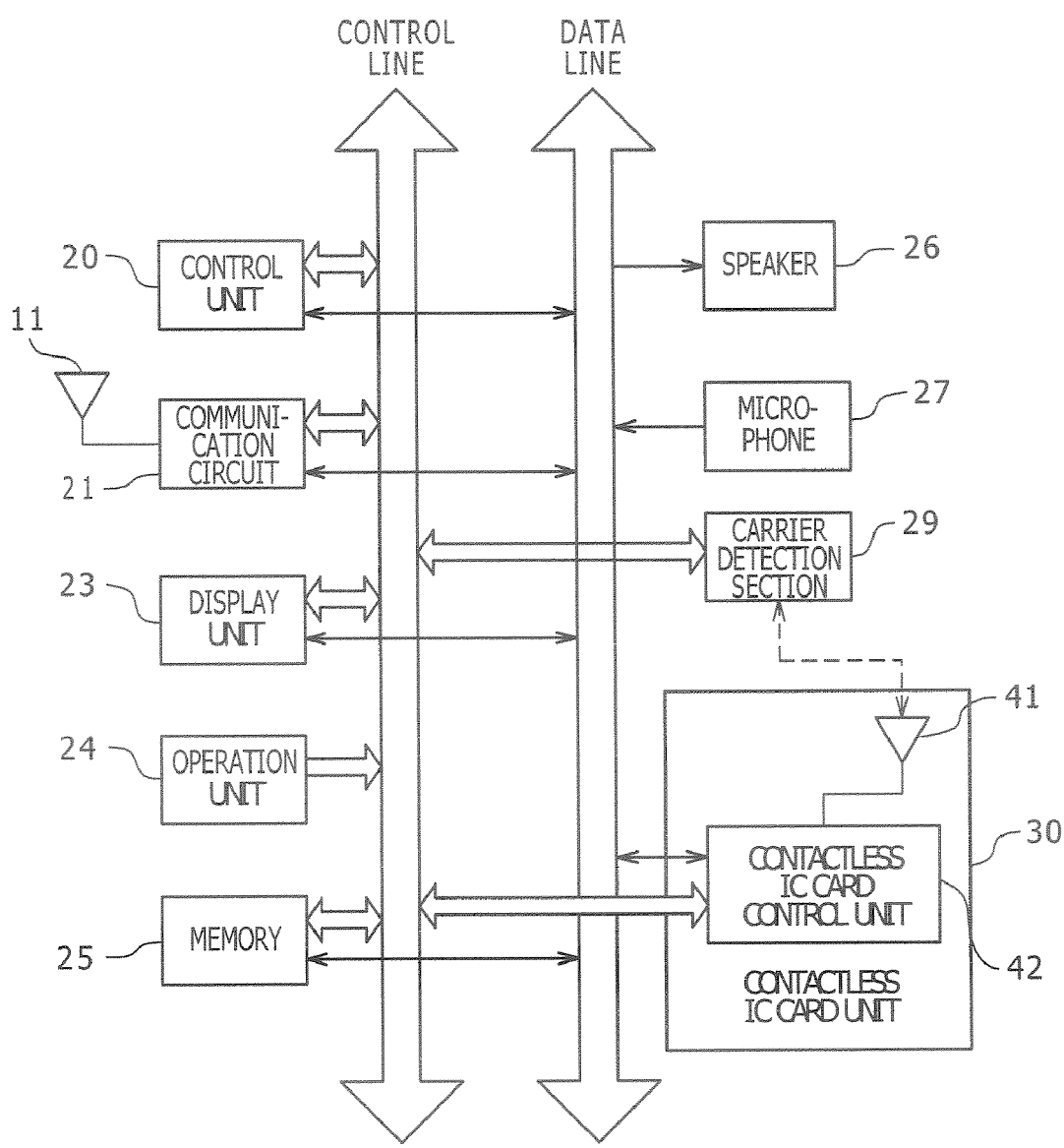
FIG. 7 is a block diagram showing a schematic internal structure of the mobile phone terminal of a fifth embodiment of the present invention.

In the mobile phone terminal as shown in this FIG. 7, a memory 51 Includes a ROM and a RAM similarly to the memory 25 of FIG. The ROM stores a control program and various types of initial-setup values with which a control unit 50 controls each part, font data, dictionary data, program codes for performing the calculating operation of estimating the degradation of the wireless status due to the noise of the spurious radiation wave in the present preferred embodiment, the process of exchanging various data with the base station, the process of selecting and setting the transmission speed to be used, control of the contactless IC card function, etc., other program codes for various types of applications, identification information (ID), information on the coefficient and the constant used for the calculation operation for estimating the degradation of the wireless status due to the noise of the spurious radiation wave, various user setup values, etc.

A contactless IC card unit 30 is built in the mobile phone terminal, and is provided with an antenna 41 for communicating with a not-shown external contactless IC card reader/writer and a control unit (contactless IC card control unit) 42 for writing and reading fee collection data etc. into/from the contactless card.

A carrier detection unit 29 detects a carrier signal transmitted from the not-shown external contactless IC card reader/writer.

Besides coding and decoding the telephone call voice data, controlling each constituent element of the mobile phone terminal, etc, and various types of calculation operations, the control unit 50 performs a variety of processes, such as the calculation operation for estimating the degradation of the wireless status due to the noise of the spurious radiation wave when using the contactless IC card function, the process of exchanging various data with the base station, the control of the contactless IC card unit 30, selection setup process for the transmission speed to be used, etc.

Flow of Transmission Speed Setup Process in Fifth Embodiment

Hereafter, a flow in the mobile phone terminal of the mobile phone system of the fifth embodiment, when the terminal is, for example, engaged, data communicating, or waiting in the area, from when the carrier signal caused by the starting of the external contactless IC card reader/writer is detected by the mobile phone terminal until the transmission speed is changed will be described using a flow chart of FIG. 8, with reference to a structure of FIG. 7. In addition, the processing steps in FIG. 8 which are the same as those in FIG. 2 mentioned above are given the same reference signs as in FIG. 2, and the description will be omitted.

Figure 8:
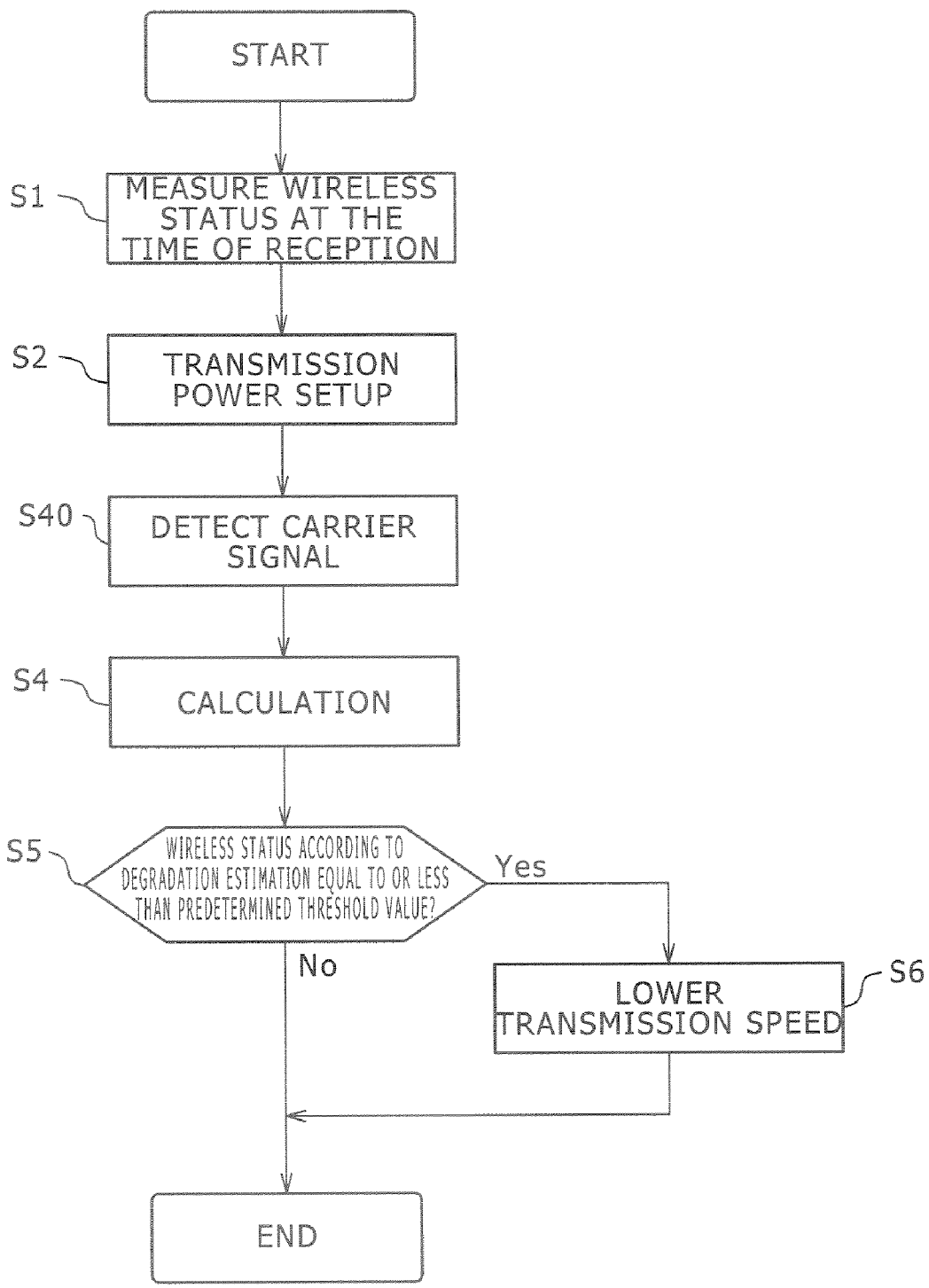
FIG. 8 is a flow chart showing a flow from when the mobile phone terminal detects a carrier signal of an external contactless IC card reader/writer until the control of lowering the transmission speed is performed in the mobile phone system of the fifth embodiment.

In FIGS. 7 and 8, when the mobile phone terminal is engaged, data communicating or waiting in the area, if the carrier signal from the external contactless IC card reader/writer is detected by the carrier detection unit 29 as shown in step S40, the control unit 20 moves the processing to step S4, and estimates the degradation of the wireless status by calculating the equation (7).

Conclusion of Fifth Embodiment

According to the mobile phone system of the fifth embodiment in accordance with the present invention, when the carrier signal from external the contactless IC card reader/writer is detected the calculation operation of the degradation estimation of the wireless status similar to that of the first embodiment is started, thereby the reception sensitivity degradation due to the spurious radiation wave at the time of using the contactless IC card function within the mobile phone can be eliminated.

Sixth Embodiment

Next, the mobile phone system of a sixth embodiment of the present invention will be described.

In the mobile phone system of the sixth embodiment in accordance with the present invention, the transmission speed is lowered under control of the base station similarly to the second embodiment In addition, the internal structure of the mobile phone terminal of the sixth embodiment is substantially the same as that of FIG. 7 and the description will be omitted.

Hereafter, a flow in the mobile phone system of the sixth preferred embodiment in accordance with the present invention, when the mobile phone terminal is engaged, or waiting in the area, from when the carrier signal caused by the starting of the external contactless IC card reader/writer function is detected by the mobile phone terminal until the transmission speed is actually lowered will be described using a time arrow of FIG. 9, with reference to FIG. 7. In addition, the processing steps in FIG. 9 which are the same as those in FIG. 3 are given the same reference signs as in FIG. 3, and the description will be omitted.

Figure 9:
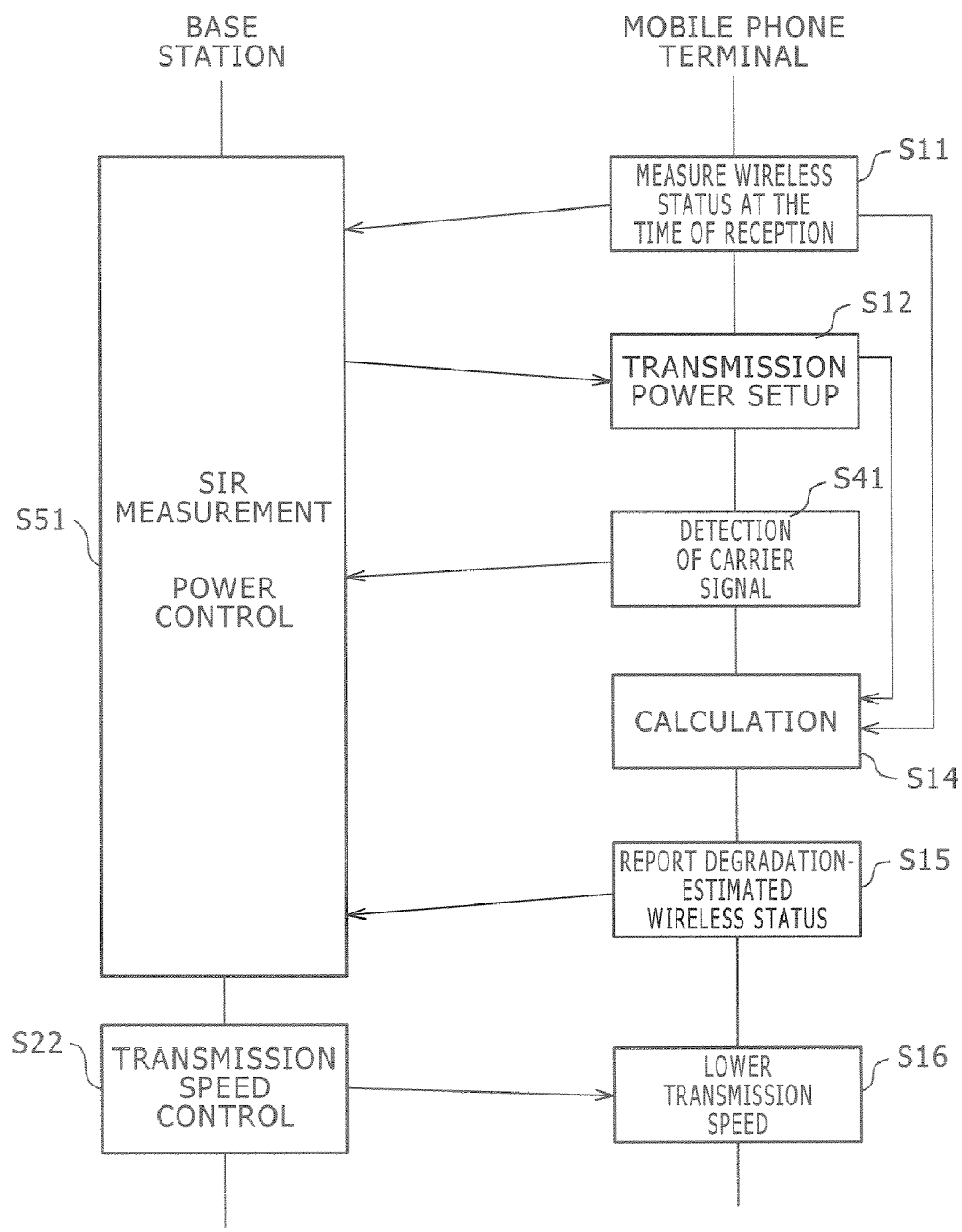
FIG. 9 is a time arrow showing a flow from when the mobile phone terminal detects the carrier signal of the external contactless IC card reader/writer until the control of lowering the transmission speed is performed in the base station of the mobile phone system of a sixth embodiment.

In FIGS. 7 and 9, if the carrier detection unit 29 detects the carrier signal from the contactless IC card reader/writer when the mobile phone terminal is engaged or waiting in the area as shown in step S41, the control unit 50 of the mobile phone terminal reports the information showing that the carrier signal is detected to the base station.

Further, the base station having received detection information of the carrier signal and the value indicating the wireless status judges in step S22 whether to perform the control for lowering the transmission speed on the basis of the SIR value. In a case where the base station determines that, if the transmission speed is not lowered, when the contactless IC card function is used at the mobile phone terminal, the reception sensitivity degradation due to the spurious radiation wave takes place and it is impossible to perform good communication the base station transmits the instruction to lower the transmission speed to the mobile phone terminal in step S22.

Figure 10:
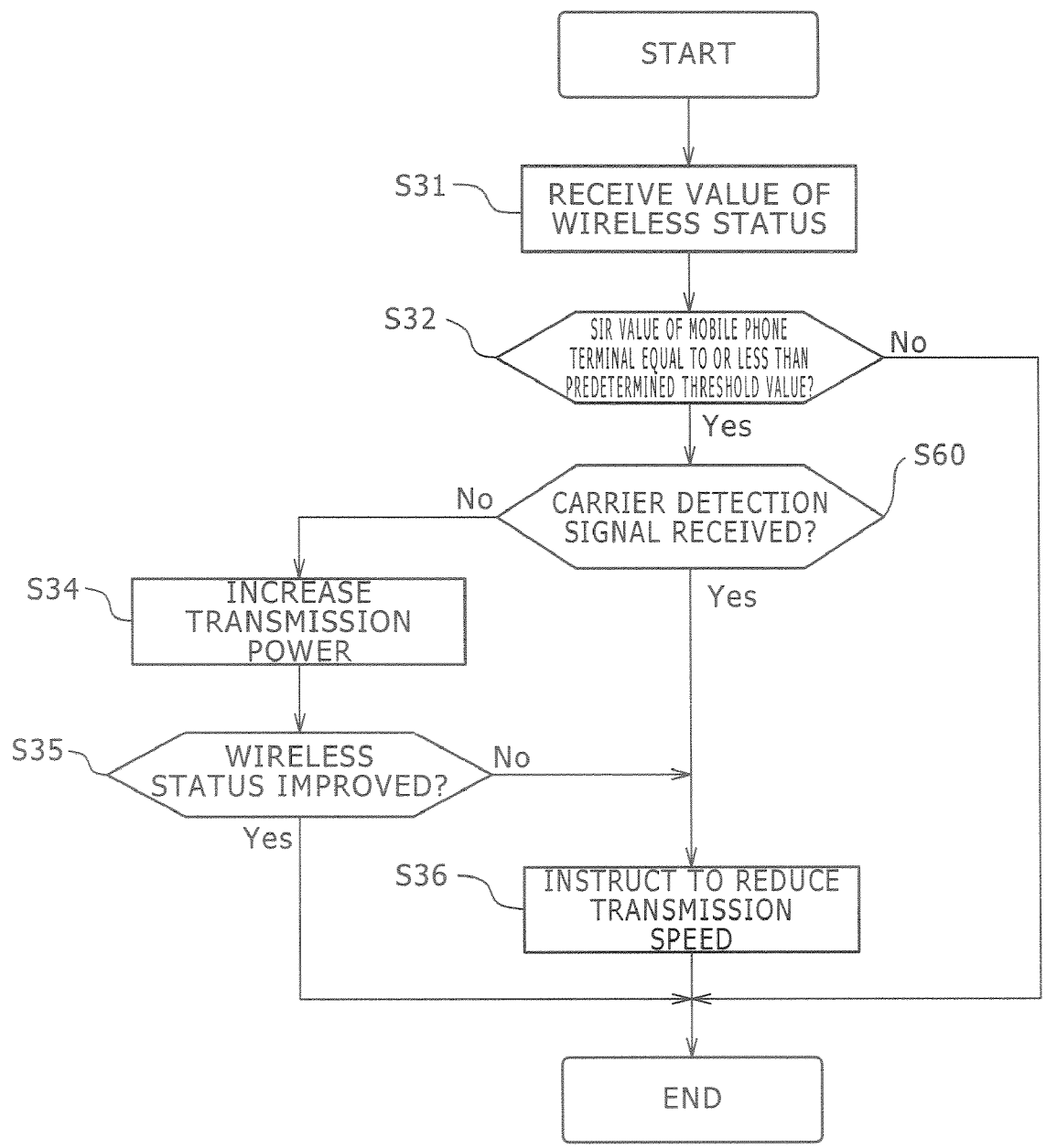
FIG. 10 is a flow chart showing in detail the process of determining whether or not the control of lowering the transmission speed is necessary in the base station of the mobile phone system of the sixth embodiment.

Details of Determination Process for Controlling Transmission Speed in Base Station in Sixth Embodiment Among the processes performed in the base station, FIG. 10 shows a detailed flow of the processing in steps 51 and 22 of FIG. 9 mentioned above. In addition the processing steps in FIG. 10 which are the same as those in FIG. 4 are given the same reference signs as in FIG. 4 and the description will be omitted.

In FIG. 10, in a case where it is judged in step S32 that the SIR value is equal to or less than the predetermined threshold value, the base station determines whether or not the detection information of the carrier signal is received from the mobile phone terminal in step S66. The base station moves the processing to step S36 in a case of having determined in step S60 that the carrier signal detection information is received, and moves the processing to step S34 in a case of having determined that the carrier signal detection information is not received.

In other words, according to this sixth embodiment, in the case where it is judged that the SIR value is equal to or less than the predetermined threshold value, or in the case it is determined that the wireless status is degraded, and when it has recognized that the degradation of the value of the wireless status is caused by the carrier signal from the contactless card reader/writer, the base station instructs the mobile phone terminal to lower the transmission speed. As with the second embodiment, in the case of the sixth embodiment, unless it is determined in step S32 that the SIR value is equal to or less than the predetermined threshold value, the base station does not move the processing to step 660. Thus, for example, even if it has received the carrier signal detection information from the mobile phone terminal it does not send the instruction to lower the transmission speed to the mobile phone terminal in the case where the wireless status is not degraded.

Conclusion of Sixth Embodiment

As described above, according to the mobile phone system of the sixth embodiment of the present invention, in the case where the cause of degradation in the wireless status is the carrier signal from the contactless card reader/writer, the reception sensitivity degradation due to the spurious radiation wave at the time of using the contactless IC card function can be eliminated by performing the control to lower the transmission speed.

Further, according to the mobile phone system of this sixth embodiment, even in the case where the contactless card function is used by the mobile phone terminal, the control to lower the transmission speed is not performed unless the wireless status degrades. Thus, the increase in the load with respect to the mobile phone system due to the execution of the unnecessary transmission speed change process can be inhibited.

Seventh Embodiment

Next, the mobile phone system of a seventh embodiment according to the present invention will be described.

In the seventh embodiment of the present invention, only the carrier signal detection information is sent from the mobile phone terminal to the base station. While, the base station side transmits the instruction to invariably lower the transmission speed to the mobile phone terminal when receiving the information.

A flow in the mobile phone system of the seventh embodiment of the present invention, when the mobile phone terminal is engaged or waiting in the area, from when the carrier detection unit 29 detects the carrier signal until the control for lowering the transmission speed is performed will be described with reference to a time arrow of FIG. 11. In addition, the processing steps in FIG. 11 which are the same as those in FIG. 5 are given the same reference signs as in FIG. 5, and the description will be omitted.

Figure 11:
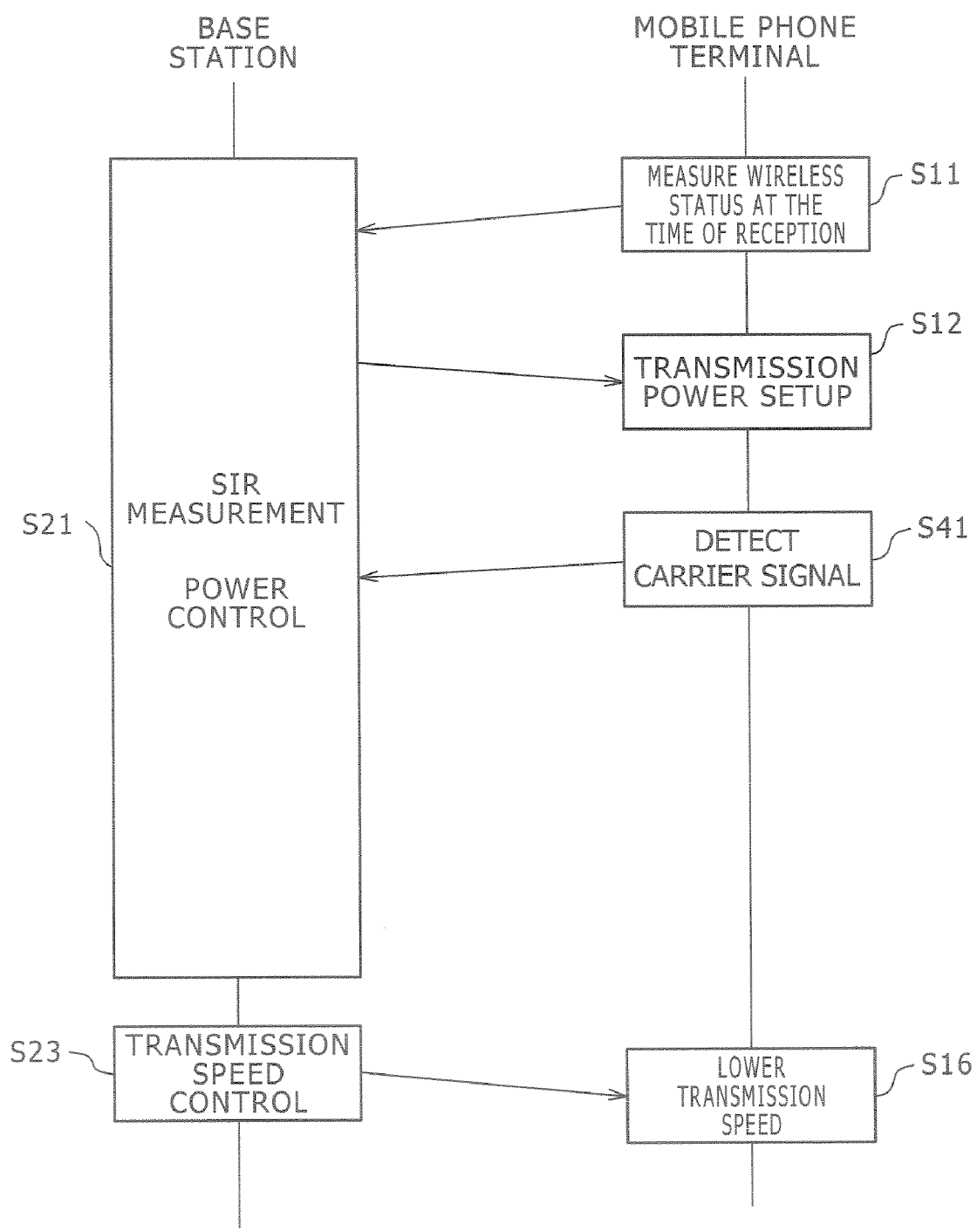
FIG. 11 is a time arrow showing a flow from when the mobile phone terminal detects the carrier signal of the external contactless IC card reader/writer until the control of lowering the transmission speed is performed in the mobile phone system of a seventh embodiment.

In FIG. 11 as shown in step S41, if the carrier detection unit 29 detects the carrier signal when the mobile phone terminal is engaged or waiting in the area, the control unit 50 of the mobile phone terminal reports the carrier signal detection information to the base station, and does not transmit the degradation estimation of the wireless status as described in the sixth embodiment and the value indicating of the wireless status by the degradation estimation.

As described above, the base station having received the carrier signal detection information from the mobile phone terminal determines in step S23 that the transmission speed is controlled and lowered, and transmits the instruction to lower the transmission speed to the mobile phone terminal.

Conclusion of Seventh Embodiment

According to the mobile phone system of the seventh embodiment in accordance with the present invention, since it is determined whether or not the transmission speed is lowered only on the basis of the existence of the carrier signal detection, and it is arranged that the transmission speed is invariably lowered in the case where the carrier signal is detected. Thus, the reception sensitivity degradation due to the spurious radiation wave when the contactless IC card function is used can be eliminated certainly.

Further, according to the mobile phone system of the seventh embodiment, since it is not necessary for the mobile phone terminal side to perform the calculation operation for estimating the degradation of the wireless status, the processing loads on the control unit 50 decrease On the other hand, in the base station side, determination on whether or not the control for lowering the transmission speed is required may be carried out only on the basis of the existence of the carrier signal detection information, thereby the processing loads also decrease.

Eighth Embodiment

Next, the mobile phone system of an eighth embodiment in accordance with the present invention will be described.

In the eighth embodiment of the present invention, the mobile phone terminal detects the carrier signal and sends only the value of the wireless status found by the calculation operation of the degradation estimation to the base station. While, the base station side determines whether or not the control for lowering the transmission speed is necessary on the basis of the value of the wireless status.

A flow in the mobile phone system of the eighth embodiment of the present invention, when the mobile phone terminal is engaged or waiting in the area, from when the carrier signal is detected until the control for lowering the transmission speed is performed will be described, with reference to a time arrow of FIG. 12. In addition, the processing steps in FIG. 12 which are the same as those in FIG. 6 are given the same reference signs as in FIG. 6, and the description will be omitted.

Figure 12:
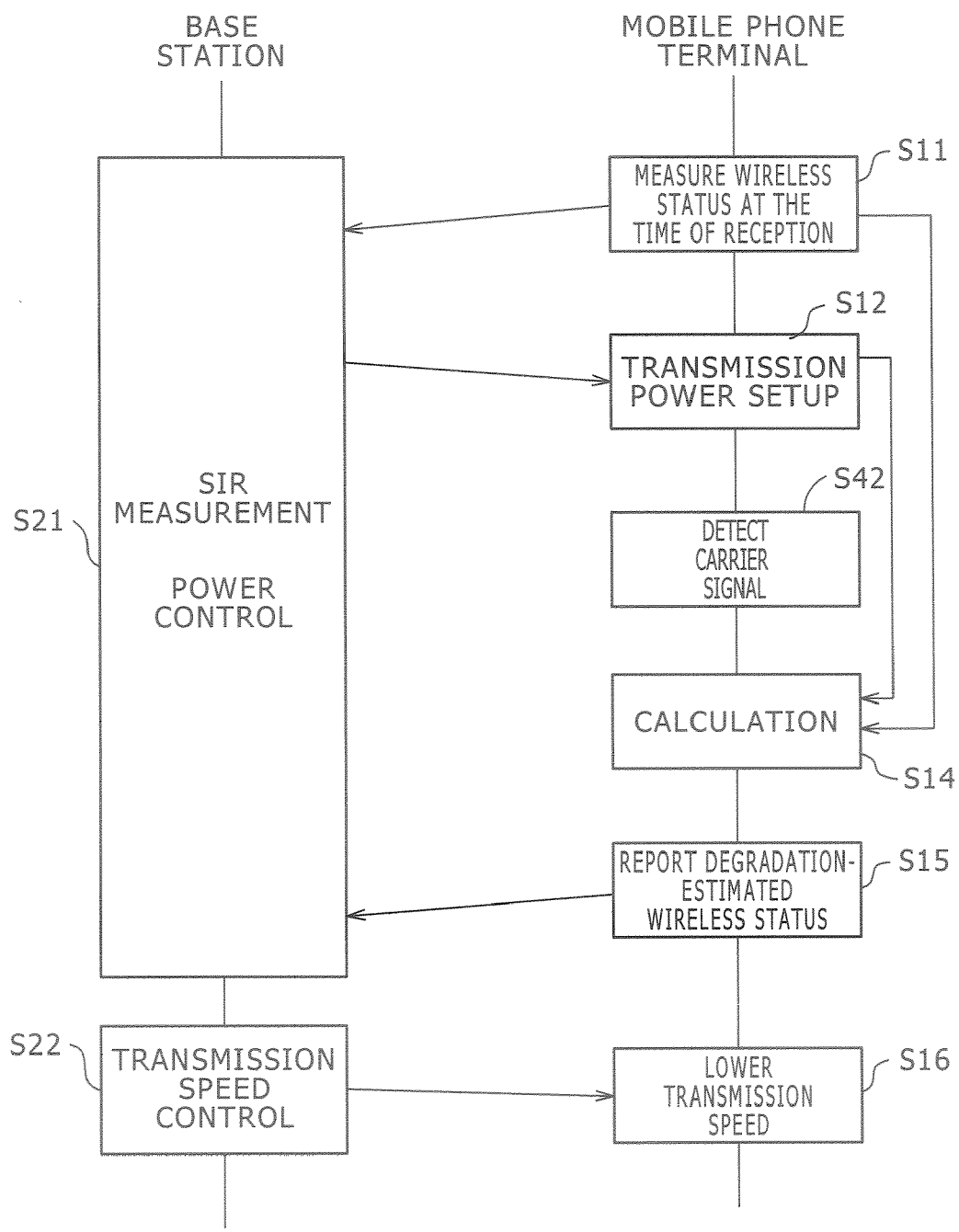
FIG. 12 is a time arrow showing a flow from when the mobile phone terminal detects the carrier signal of the external contactless IC card reader/writer until he control of lowering the transmission speed is performed in the mobile phone system of an eighth embodiment.
Figure 13:
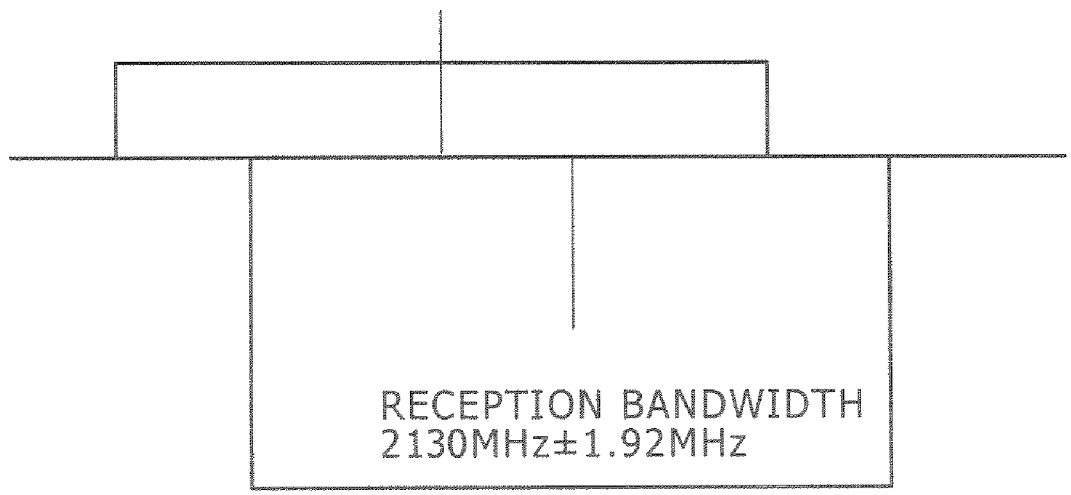
FIG. 13 is a chart used for explaining a situation where the fourteenth order harmonic of a carrier wave of the contactless IC card reader/writer is generated in a reception frequency band of the mobile phone terminal of a W-CDMA system.
Figure 14:
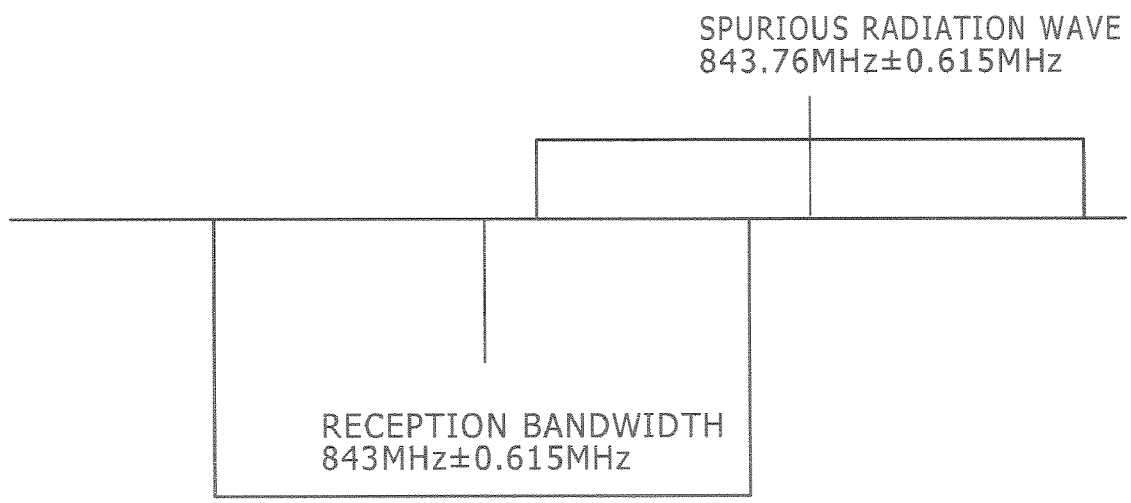
FIG. 14 is a chart used for explaining a situation where the fourth order harmonic of the carrier wave of the contactless IC card reader/writer is generated as noise in a reception frequency band of a mobile phone terminal of a cdma2000 system

In FIG. 12, if the carrier signal is detected when the mobile phone terminal is engaged or waiting in the area as shown in step S42, the control unit 50 of the mobile phone terminal moves the processing to step S14 immediately without reporting the carrier signal detection information to the base station. Then, in step S15, the control unit 20 of the mobile phone terminal reports, to the base station, the value of the wireless status found by the calculation operation of the degradation estimation as described above.

As described above, the base station having received the value of the wireless status from the mobile phone terminal determines whether or not the control for lowering the transmission speed is necessary on the basis of the value which shows the wireless status, as described in the step S22 above.

Conclusion of Eighth Embodiment

According to the mobile phone system of the eighth embodiment of the present invention, when the SIR value calculated from the value of the wireless status by the degradation estimation is equal to or less than the predetermined threshold value, the reception sensitivity degradation due to the spurious radiation wave at the time of using the contactless IC card reader/writer can be eliminated by performing the control for lowering the transmission speed.

Further, according to the mobile phone system of this eighth embodiment, since the mobile phone terminal side does not need to send the carrier signal detection information to the base station, the processing loads on the control unit 50 decrease On the other hand, in the base station sides it is not necessary to determine whether or not the control for lowering the transmission speed is required by using the carrier signal detection information, thus the processing loads are reduced.

It is noted that each of the embodiments as described above is an example of the present invention. Therefore, the present invention is not limited to the embodiments, and a lot of variations other than the embodiments may be naturally made in accordance with the design etc without departing from the technical idea of the present invention.

The above-mentioned preferred embodiments illustrate the contactless IC card reader/writer and the contactless IC card as an example of a contactless communication function, however, the present invention is applicable to a so-called radio tag, its reading equipment, etc., for example.

Further, the present invention is not limited to the mobile phone terminal and its system, and can also be applied to various types of mobile terminals, such as PDA (Personal Digital Assistant), a note type personal computer, a digital camera, etc., which have the wireless-communications function and are provided with the contactless IC card reader/writer function or the contactless IC card function.

The invention claimed is:

1. A mobile wireless communication terminal having a contactless communication function to perform contactless communication by using a carrier wave of a predetermined frequency, the mobile wireless communication terminal comprising:

communication means for performing wireless communications with a base station by using a frequency band overlapping at least in part with a spurious radiation wave frequency range resulting from the carrier wave of said predetermined frequency;

transmission power setup means for setting up signal transmission power in accordance with an instruction from said base station;

reception intensity measurement means for measuring signal reception intensity in wireless communications with said base station;

reception quality information generation means for generating information representing reception quality of the terminal on the basis of the signal reception intensity measured by said reception intensity measurement means;

noise power estimation means for estimating noise power of said spurious radiation wave in the frequency band used for the wireless communications with said base station, on the basis of the signal transmission power set up by said transmission power setup means, the signal reception intensity measured by said reception intensity measurement means, and a coefficient inherent to the terminal;

detection means for detecting at least that said contactless communication function is started; and control means for comparing a predetermined threshold value with said reception quality taking account of the estimated noise power of said spurious radiation wave when said detection means detects that said contactless communication function is started, and for controlling said communication means to lower a transmission speed for wireless communication with said base station in a case where said reception quality is equal to or less than the predetermined threshold value.

2. The mobile wireless communication terminal according to claim 1, wherein said control means causes, after lowering the transmission speed for wireless communications with the base station, said contactless communication function to perform contactless communications.

3. A mobile wireless communication terminal having a contactless communication function to perform contactless communication by using a carrier wave of a predetermined frequency, the mobile wireless communication terminal comprising:

communication means for performing wireless communications with a base station by using a frequency band overlapping at least in part with a spurious radiation wave frequency range resulting from the carrier wave of said predetermined frequency;

detection means for detecting at least that said contactless communication function is started;

control means for generating a predetermined signal when said detection means detects that said contactless communication function is started, causing said communication means to transmit the predetermined signal from to said base station, and controlling said communication means to lower the transmission speed for wireless communication with the base station when receiving an instruction to lower the transmission speed from the base station after transmitting the predetermined signal to the base station;

transmission power setup means for setting up signal transmission power in accordance with the instruction from said base station;

reception intensity measurement means for measuring signal reception intensity in wireless communications with said base station;

reception quality information generation means for generating information representing a reception quality of the terminal on the basis of the signal reception intensity measured by said reception intensity measurement means; and noise power estimation means for estimating noise power of said spurious radiation wave in a frequency band used for the wireless communications with said base station, based on the signal transmission power set up by said transmission power setup means, the signal reception intensity measured by said reception intensity measurement means, and a coefficient inherent to the terminal, wherein when said detection means detects that said contactless communication function is started, said control means causes said reception quality information generating means to generate information on the reception quality taking account of said noise power estimated by said noise power estimation means, and causes the reception quality information and the detection information of said detection means to be transmitted, as said predetermined signal, from said communication means to said base station.

4. The mobile wireless communication terminal according to claim 3, wherein, when said detection means detects that said contactless communication function is started, said control means allows the detection information of said detection means to be transmitted as said predetermined signal from said communication means to said base station.

5. The mobile wireless communication terminal according to claim 3, further comprising:
   instruction input acquisition means being capable of acquiring an instruction input from a user, wherein said detection means detects that said contactless communication function is started in response to a predetermined instruction input by the user through said instruction input means.

6. The mobile wireless communication terminal according to claim 3, wherein said detection means detects that said contactless communication function is started, when detecting the carrier wave of said predetermined frequency.

7. The mobile wireless communication terminal according to claim 3, wherein said control means transmits said predetermined signal to the base station, receives the instruction to lower the transmission speed from the base station, controls said communication means, and lowers the transmission speed in the case of the wireless communications with the base station, then causes said contactless communication function to perform contactless communication.

8. A mobile wireless communication terminal having a contactless communication function to perform contactless communication by using a carrier wave of a predetermined frequency, the mobile wireless communication terminal comprising:
   communication means for performing wireless communications with a base station by using a frequency band overlapping at least in part with a spurious radiation wave frequency range resulting from the carrier wave of said predetermined frequency;
   detection means for detecting at least that said contactless communication function is started;
   control means for generating a predetermined signal when said detection means detects that said contactless communication function is started, causing said communication means to transmit the predetermined signal from to said base station, and controlling said communication means to lower the transmission speed for wireless communication with the base station when receiving an instruction to lower the transmission speed from the base station after transmitting the predetermined signal to the base station;
   transmission power setup means for setting up signal transmission power in accordance with the instruction from said base station;
   reception intensity measurement means for measuring signal reception intensity in wireless communications with said base station;
   reception quality information generation means for generating information representing a reception quality of the terminal on the basis of the signal reception intensity measured by said reception intensity measurement means; and
   noise power estimation means for estimating noise power of said spurious radiation wave in a frequency band used for the wireless communications with said base station, based on the signal transmission power set up by said transmission power setup means, the signal reception intensity measured by said reception intensity measurement means, and a coefficient inherent to the terminal, wherein
   when said detection means detects that said contactless communication function is started, said control means causes said reception quality information generating means to generate information on the reception quality taking account of the noise power estimated by said noise power estimation means, and causes the reception quality information to be transmitted, as said predetermined signal, from said communication means to said base station.

9. A mobile wireless communication system having a mobile wireless communication terminal provided with a contactless communication function to perform contactless communication by using a carrier wave of a predetermined frequency, and a base station for performing wireless communications with the mobile wireless communication terminal, in which wireless communications between said mobile wireless communication terminal and the base station are performed by using a frequency band overlapping at least in part with a spurious radiation wave frequency range resulting from the carrier wave of said predetermined frequency, wherein
   said mobile wireless communication terminal is configured to generate, when detecting that said contactless communication function is started, a predetermined signal, and transmit the predetermined signal to said base station,
   said base station is configured to judge, on the basis of said predetermined signal from said mobile wireless communication terminal, whether or not it is necessary to lower a transmission speed used for the wireless communications with said mobile wireless communication terminal, and transmit an instruction to lower the transmission speed to the mobile wireless communication terminal when it judges that it is necessary to lower said transmission speed,
   said mobile wireless communication terminal is configured to lower, when receiving the instruction to lower said transmission speed from said base station, the transmission speed used for the wireless communications with the base station,
   said base station is configured to direct signal transmission power to said mobile wireless communication terminal,
   said mobile wireless communication terminal is configured to estimate when detecting that said contactless communication function is started, noise power of said spurious radiation wave in the frequency band used for the wireless communications with said base station, on the basis of the signal reception intensity in wireless communications with said base station, the signal transmission power directed by said base station, and a coefficient inherent to the terminal, generate information on the reception quality taking account of the estimated noise power, and transmit the reception quality information and the detection information on the starting of said contactless communication function, as said predetermined signal, to said base station, and
   said base station is configured to compare, when receiving the information on said reception quality and said detection information from said mobile wireless communication terminal, said reception quality with a predetermined threshold value, and judge that it is necessary to lower the transmission speed with respect to said mobile phone terminal, in a case where said reception quality is equal to or less than the predetermined threshold value.

10. The mobile wireless communication system according to claim 9, wherein
said mobile wireless communication terminal is configured to transmit, when detecting that said contactless communication function is started, the detection information on the starting of the contactless communication function to said base station as said predetermined signal, and
said base station is configured to judge, when receiving said detection information from said mobile wireless communication terminal, that it is necessary to lower the transmission speed with respect to said mobile phone terminal.

11. The mobile wireless communication system according to claim 9, wherein said mobile wireless communication terminal is configured to detect that said contactless communication function is started in response to a predetermined instruction input from a user.

12. The mobile wireless communication system according to claim 9, wherein said mobile wireless communication terminal is configured to detect, when detecting the carrier wave of said predetermined frequency, that said contactless communication function is started.

13. The mobile wireless communication system according to claim 9, wherein said mobile wireless communication terminal is configured to transmit said predetermined signal to the base station, receive the instruction to lower the transmission speed from the base station, and lower the transmission speed in the case of the wireless communications with said base station, then cause said contactless communication function to perform contactless communication.

14. A mobile wireless communication system having a mobile wireless communication terminal provided with a contactless communication function to perform contactless communication by using a carrier wave of a predetermined frequency, and a base station for performing wireless communications with the mobile wireless communication terminal, in which wireless communications between said mobile wireless communication terminal and the base station are performed by using a frequency band overlapping at least in part with a spurious radiation wave frequency range resulting from the carrier wave of said predetermined frequency, wherein
said mobile wireless communication terminal is configured to generate, when detecting that said contactless communication function is started, a predetermined signal, and transmit the predetermined signal to said base station,
said base station is configured to judge, on the basis of said predetermined signal from said mobile wireless communication terminal, whether or not it is necessary to lower a transmission speed used for the wireless communications with said mobile wireless communication terminal, and transmit an instruction to lower the transmission speed to the mobile wireless communication terminal when it judges that it is necessary to lower said transmission speed,
said mobile wireless communication terminal is configured to lower, when receiving the instruction to lower said transmission speed from said base station, the transmission speed used for the wireless communications with the base station,
said base station is configured to direct signal transmission power to said mobile wireless communication terminal,
said mobile wireless communication terminal is configured to estimate, when detecting that said contactless communication function is started, noise power of said spurious radiation wave in the frequency band used for the wireless communications with said base station, on the basis of the signal reception intensity in wireless communications with said base station, the signal transmission power directed by said base station, and a coefficient inherent to the terminal, generate information on the reception quality taking account of the estimated noise power, and transmit the reception quality information as said predetermined signal, to said base station,
said base station is configured to compare said reception quality from said mobile wireless communication terminal with a predetermined threshold value, and judge that it is necessary to lower the transmission speed with respect to said mobile phone terminal, in a case where said reception quality is equal to or less than the predetermined threshold value.

15. A mobile wireless communication terminal having a contactless communication function to perform contactless communication by using a carrier wave of a predetermined frequency, the mobile wireless communication terminal comprising:
an interface configured to perform wireless communications with a base station by using a frequency band overlapping at least in part with a spurious radiation wave frequency range resulting from the carrier wave of said predetermined frequency;
a control unit configured to set up signal transmission power in accordance with an instruction from said base station, measure signal reception intensity in wireless communications with said base station, generate information representing reception quality of the terminal on the basis of the measured signal reception intensity, estimate noise power of said spurious radiation wave in the frequency band used for the wireless communications with said base station, on the basis of the signal transmission power set up, the measured signal reception intensity, and a coefficient inherent to the terminal, detect at least that said contactless communication function is started, compare a predetermined threshold value with said reception quality taking account of the estimated noise power of said spurious radiation wave when it is detected that said contactless communication function is started, and control said interface to lower a transmission speed for wireless communication with said base station in a case where said reception quality is equal to or less than the predetermined threshold value.

* * * * *